United States Patent
Truong et al.

(10) Patent No.: US 12,266,155 B2
(45) Date of Patent: Apr. 1, 2025

(54) FEATURE POINT DETECTION

(71) Applicant: Ikerian AG, Bern (CH)

(72) Inventors: Prune Solange Garance Truong, Bern (CH); Sandro Ivo Sebastiano De Zanet, Bern (CH); Stefanos Apostolopoulos, Bern (CH)

(73) Assignee: Ikerian AG, Bern (CH)

( * ) Notice: Subject to any disclaimer, the term of this patent is extended or adjusted under 35 U.S.C. 154(b) by 443 days.

(21) Appl. No.: 17/438,944

(22) PCT Filed: Mar. 12, 2020

(86) PCT No.: PCT/EP2020/056710
§ 371 (c)(1),
(2) Date: Sep. 14, 2021

(87) PCT Pub. No.: WO2020/187705
PCT Pub. Date: Sep. 24, 2020

(65) Prior Publication Data
US 2022/0157047 A1    May 19, 2022

(30) Foreign Application Priority Data

Mar. 15, 2019 (EP) .................................... 19163191
Oct. 30, 2019 (EP) .................................... 19206339

(51) Int. Cl.
*G06V 10/774* (2022.01)
*G06T 7/33* (2017.01)
(Continued)

(52) U.S. Cl.
CPC .............. *G06V 10/774* (2022.01); *G06T 7/33* (2017.01); *G06V 10/757* (2022.01);
(Continued)

(58) Field of Classification Search
None
See application file for complete search history.

(56) References Cited

U.S. PATENT DOCUMENTS

2014/0350839 A1* 11/2014 Pack .................... G05D 1/0274
                                                                        901/1
2017/0337682 A1* 11/2017 Liao ..................... A61B 5/7267

OTHER PUBLICATIONS

LF-Net: Learning Local Features from Images. Ono et al. (Year: 2018).*

(Continued)

*Primary Examiner* — Delomia L Gilliard
(74) *Attorney, Agent, or Firm* — N.V. Nederlandsch Octrooibureau

(57) ABSTRACT

A method to train a model for feature point detection involves obtaining a first image and a second image. The method involves generating a first score map for the first image and a second score map for the second image using the model. The method involves selecting a first plurality of interest points in the first image based on the first score map. The method involves selecting a second plurality of interest points in the second image based on the second score map. Pairwise matching of a first interest point among the first plurality of interest points with a second interest point among the second plurality of interest points is performed. Correctness of the pairwise matches is checked based on a ground truth, to generate a reward map. The score map and the reward map are compared and used to update the model.

16 Claims, 12 Drawing Sheets

(51) Int. Cl.
*G06V 10/74* (2022.01)
*G06V 10/75* (2022.01)
*G06V 10/764* (2022.01)

(52) U.S. Cl.
CPC .......... *G06V 10/761* (2022.01); *G06V 10/764* (2022.01); *G06T 2207/20081* (2013.01)

(56) References Cited

OTHER PUBLICATIONS

GLAMpoints: Greedily Learned Accurate Match points. Troung et al. (Year: 2019).*
Truong et al: "GLAMpoints: Greedily Learned Accurate Match points", arxiv.org, Cornell University Library. 201 Olin Library Cornell University Ithaca, NY, 14853, Aug. 19, 2019 (Aug. 19, 2019), XP081510099.
Ono et al: "LF-Net: Learning Local Features from Images", rxiv.org, Cornell University Library, 201 Olin Library Cornell University Ithaca, NY, 14853, May 24, 2018 (May 24, 2018), XP081425728.

* cited by examiner

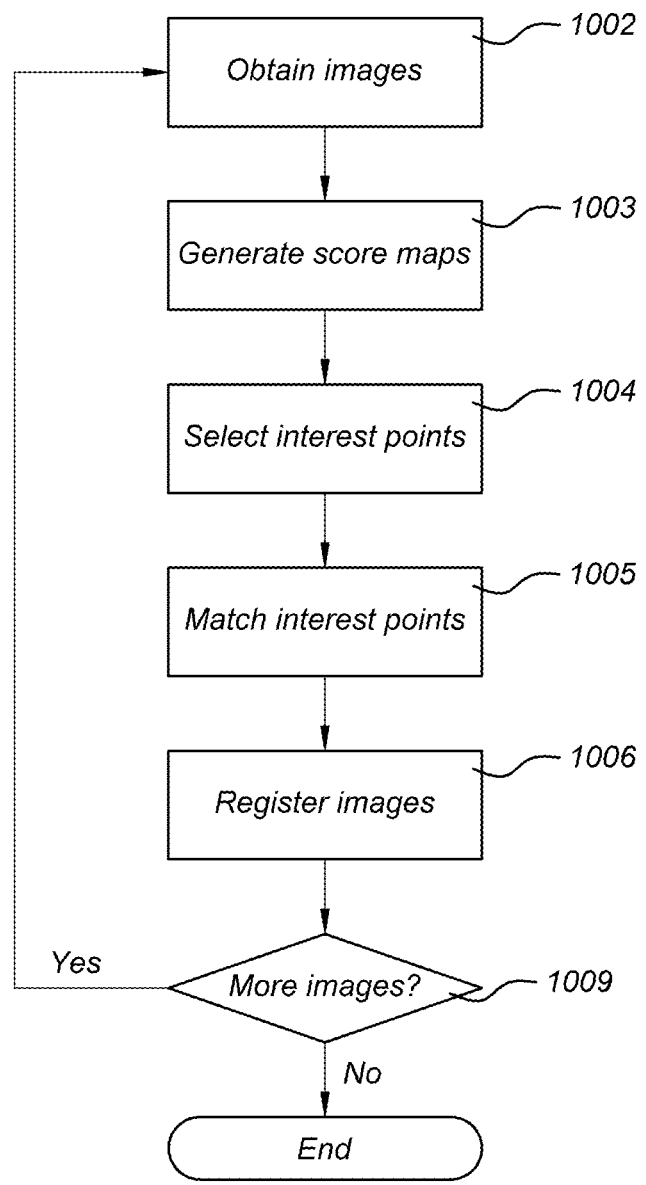

FEATURE POINT DETECTION

FIELD OF THE INVENTION

The invention relates to feature detection. The invention relates more particularly to feature detection for image registration. The invention further relates to image registration using detected feature points.

BACKGROUND OF THE INVENTION

Image registration, a process of aligning two or more images into the same global spatial reference, is a crucial element in the fields of computer vision, pattern recognition and medical image analysis. Imaging in the medical field is a challenging task. This may sometimes lead to poorer image quality, compared to, for example, regular photography. The presence of noise, blur and other imaging artefacts, in combination with the nature of the imaged tissue, does not lend itself to classical, state-of-the-art feature detectors optimized for natural images. Moreover, domain specific manual crafting of a new feature detector is a time-consuming task with no guarantee of success.

Existing registration algorithms can be classified as area-based and feature-based approaches. The area-based approach typically relies on a similarity metric such as cross-correlation [15], mutual information [33, 4] or phase correlation [24] to compare the intensity patterns of an image pair and estimate the transformation. However, in the case of changes in illumination or small overlapping areas, the area-based approaches become challenging or impossible. Conversely, feature-based approaches extract corresponding points on pairs of images and search for a transformation that minimizes the distance between the detected feature points. Compared with area-based registration techniques, they are more robust to changes of intensity, scale and rotation and are, therefore, considered more appropriate for problems such as medical image registration. Typically, feature extraction and matching of two images comprise four steps: detection of interest points, description for each feature, matching of corresponding features and estimation of a transformation between the images using the matches. As can be seen, the detection step influences every further step and is therefore crucial for a successful registration. It requires a high image coverage and stable key points in low contrasts images.

In the literature, local interest point detectors have been thoroughly evaluated. SIFT [29] is probably the most well-known detector/descriptor in computer vision. It computes corners and blobs on different scales to add scale invariant and extracts descriptors using the local gradients. Root SIFT [9] was shown to enhance results as compared to SIFT. Speeded-Up Robust Features (SURF) [12] is a faster alternative, using Haar filters and integral images, while KAZE [7] exploits non-linear scale space for more accurate keypoint detections.

In the field of fundus imaging, a widely used technique relies on vascular trees and branch point analysis [28, 21]. But accurately segmenting the vascular trees is challenging and registration often fail on images with few vessels. Alternative registration techniques are based on matching repeatable local features: Chen et al. detected Harris corners [22] on low quality multi-modal retinal images and assigned them a partial intensity invariant feature (Harris-PIIFD) descriptor [14]. They achieved good results on low quality images with an overlapping area superior to 30%, but they are characterized by low repeatability. Wang et al. [41] used SURF features to increase the repeatability and introduced a new method for point matching to reject a large number of outliers, but the success rate drops significantly when the overlapping area diminishes below 50%.

Cattin et al. [13] also demonstrated that the SURF method can be efficiently used to create mosaics of retina images even for cases with no discernible vascularization. However this technique only appeared successful in the case of highly self-similar images. D-saddle detector/descriptor [34] was shown to outperform the previous methods in terms of rate of successful registration on the Fundus Image Registration (FIRE) Dataset [23], enabling the detection of interest points on low quality regions.

Recently, with the advent of deep learning, learned detectors based on CNN architectures were shown to outperform state of the art computer vision detectors [19, 17, 44, 32, 10]. Learned Invariant Feature Transform (LIFT) [32] uses patches to train a fully differentiable deep CNN for interest point detection, orientation estimation and descriptor computation based on supervision from classical Structure from Motion (SfM) systems. SuperPoint [17] introduced a self-supervised framework for training interest point detectors and descriptors. It rises to state-of-the-art homography estimation results on HPatches [11] when compared to LIFT, SIFT and Oriented Fast and Rotated Brief (ORB). The training procedure is, however, complicated and their self-supervision implies that the network can only find points on corners. Local Feature Network (LF-NET) [32] is the closest to our method: Ono et al. trained end-to-end a keypoint detector and descriptor in a two branch set-up, one being differentiable and feeding on the output of the other non-differentiable branch. They optimized their detector for repeatability between image pairs.

Truong et al. [39] presented an evaluation of Root-SIFT, SURF, KAZE, ORB [36], Binary Robust Invariant Scalable Keypoints (BRISK) [27], Fast Retina Keypoint (FREAK) [6], LIFT, SuperPoint [17] and LF-NET [32] both in terms of image matching and registration quality on retinal fundus images. They found that while SuperPoint outperforms all the others relative to the matching performance, LIFT demonstrates the highest results in terms of registration quality, closely followed by KAZE and SIFT. They highlighted that issues with those detectors are that they detect feature points which are densely positioned to each other, and may be characterized by a similar descriptor. This can lead to false matches and thus inaccurate or failed registrations.

SUMMARY OF THE INVENTION

An aspect of the invention is to solve at least one of the problems outlined above, or provide at least one of the advantages described herein.

According to a first aspect of the invention, a method to train a model for feature point detection, comprises
  obtaining a first image and a second image;
  generating a first score map for the first image and a second score map for the second image using the model;
  selecting a first plurality of interest points in the first image based on the first score map;
  selecting a second plurality of interest points in the second image based on the second score map;
  pairwise matching of a first interest point among the first plurality of interest points with a second interest point among the second plurality of interest points;

checking correctness of the pairwise matches based on a ground truth transformation between the first image and the second image, to generate a reward map;

combining or comparing the score map and the reward map; and updating the model based on the result of the combining or comparing.

The updating of the model, based on the result of combining or comparing the score map and reward map that is based on a ground truth transformation between the first image and the second image, provides a highly direct reward that is more targeted to the goal of registering the two images. Therefore, training of the model is improved. In any embodiment disclosed herein, the model may, for example, be a learned function, an artificial neural network, or a classifier.

The selecting a plurality of interest points may comprise imposing a maximum limit on a distance from any point in the image to a nearest one of the interest points. This helps to avoid a situation in which most of the interest points are clustered together in a small area of the image. The feature helps to obtain matching points that deliver an overall better image registration.

The pairwise matching may be performed based on a similarity between a feature detected in the first image at the first interest point and a feature detected in the second image at the second interest point. This allows the interest points to be matched to interest points that have a similar feature descriptor in the other image.

The matching may be performed in a first direction by matching a first interest point to a second interest point among second interest points, the second interest point having a feature most similar to the feature at the first interest point. This finds a suitable selection of matching interest points.

The matching may be further performed in a second direction by matching a second interest point to a first interest point among first interest points, the first interest point having a feature most similar to the feature at the second interest point. This helps to improve the selection of matching interest points.

The reward map may indicate a reward for a successfully matched interest point according to ground truth data and no reward for an unsuccessfully matched interest point according to ground truth data. This helps to improve the training procedure by providing a more targeted reward map.

The combining or comparing may comprise combining or comparing only the score map and reward map for the interest points. The other points, not interest points, are many in number and may not add sufficient information to help the training procedure.

The combining or comparing may comprise balancing a number of true positive matches with a number of false positive matches by making a (possibly random) selection of the false positive matches and combining or comparing the score map and reward map only for the true positive matches and the selection of the false positive matches, wherein a true positive match is an interest point that passed the check of correctness and a false positive match is an interest point that did not pass the check of correctness. This helps to further reduce any bias towards training for 'no match'.

The combining or comparing may comprise computing a sum of squared differences between the score map and reward map. This may comprise a suitable ingredient of a training procedure.

According to another aspect of the invention, an apparatus for training a model for feature point detection comprises a control unit; and a memory comprising instructions for causing the control unit to perform the steps of: obtaining a first image and a second image; generating a first score map for the first image and a second score map for the second image using the model; selecting a first plurality of interest points in the first image based on the first score map; selecting a second plurality of interest points in the second image based on the second score map; pairwise matching of a first interest point among the first plurality of interest points with a second interest point among the second plurality of interest points; checking correctness of the pairwise matches based on a ground truth transformation between the first image and the second image, to generate a reward map; combining or comparing the score map and the reward map; and updating the model based on the result of the combining or comparing.

According to another aspect of the invention, a method of registering a first image to a second image is provided, the method comprising obtaining a first image and a second image; generating a first score map for the first image and a second score map for the second image using a model generated by the method or apparatus of any preceding claim; selecting a first plurality of interest points in the first image based on the first score map; selecting a second plurality of interest points in the second image based on the second score map; and pairwise matching of a first interest point among the first plurality of interest points with a second interest point among the second plurality of interest points.

The selecting a plurality of interest points may comprise imposing a maximum limit on a distance from any point in the image to a nearest one of the interest points.

The pairwise matching may be performed based on a similarity between a feature detected in the first image at the first interest point and a feature detected in the second image at the second interest point.

The matching may be performed in a first direction by matching a first interest point to a second interest point among second interest points, the second interest point having a feature most similar to the feature at the first interest point.

The matching may be further performed in a second direction by matching a second interest point to a first interest point among first interest points, the first interest point having a feature most similar to the feature at the second interest point.

The selecting a plurality of interest points may comprise imposing a maximum limit on a distance from any point in the image to a nearest one of the interest points.

The pairwise matching may be performed based on a similarity between a feature detected in the first image at the first interest point and a feature detected in the second image at the second interest point.

The matching may be performed in a first direction by matching a first interest point to a second interest point among second interest points, the second interest point having a feature most similar to the feature at the first interest point.

The matching may be further performed in a second direction by matching a second interest point to a first interest point among first interest points, the first interest point having a feature most similar to the feature at the second interest point.

According to another aspect of the invention, an apparatus for registering a first image to a second image is provided, comprising a control unit, e.g. at least one computer processor, and a memory comprising instructions for causing the control unit to perform the steps of: obtaining a first image and a second image; generating a first score map for the first image and a second score map for the second image using a model generated by the method or apparatus set forth; selecting a first plurality of interest points in the first image based on the first score map; selecting a second plurality of interest points in the second image based on the second score map; and pairwise matching of a first interest point among the first plurality of interest points with a second interest point among the second plurality of interest points.

According to another aspect of the invention, a model is provided, generated by the method or apparatus set forth.

An aspect of the invention is a semi-supervised learned method for keypoint detection. Detectors are often optimized for repeatability (such as LF-NET) and not for the quality of the associated matches between image pairs. An aspect of the invention is a training procedure that uses reinforcement learning to extract repeatable, stable interest points with a dense coverage and specifically designed to maximize correct matching on a specific domain. An example of such a specific domain is challenging retinal slit lamp images.

The person skilled in the art will understand that the features described above may be combined in any way deemed useful. Moreover, modifications and variations described in respect of the system and apparatus may likewise be applied to the method and to a computer program product, and modifications and variations described in respect of the method may likewise be applied to the system and apparatus.

BRIEF DESCRIPTION OF THE DRAWINGS

In the following, aspects of the invention will be elucidated by means of examples, with reference to the drawings. The drawings are diagrammatic and may not be drawn to scale.

FIG. 10 shows a flowchart of a method of registering a first image to a second image.

DETAILED DESCRIPTION OF EMBODIMENTS

Figure 1:
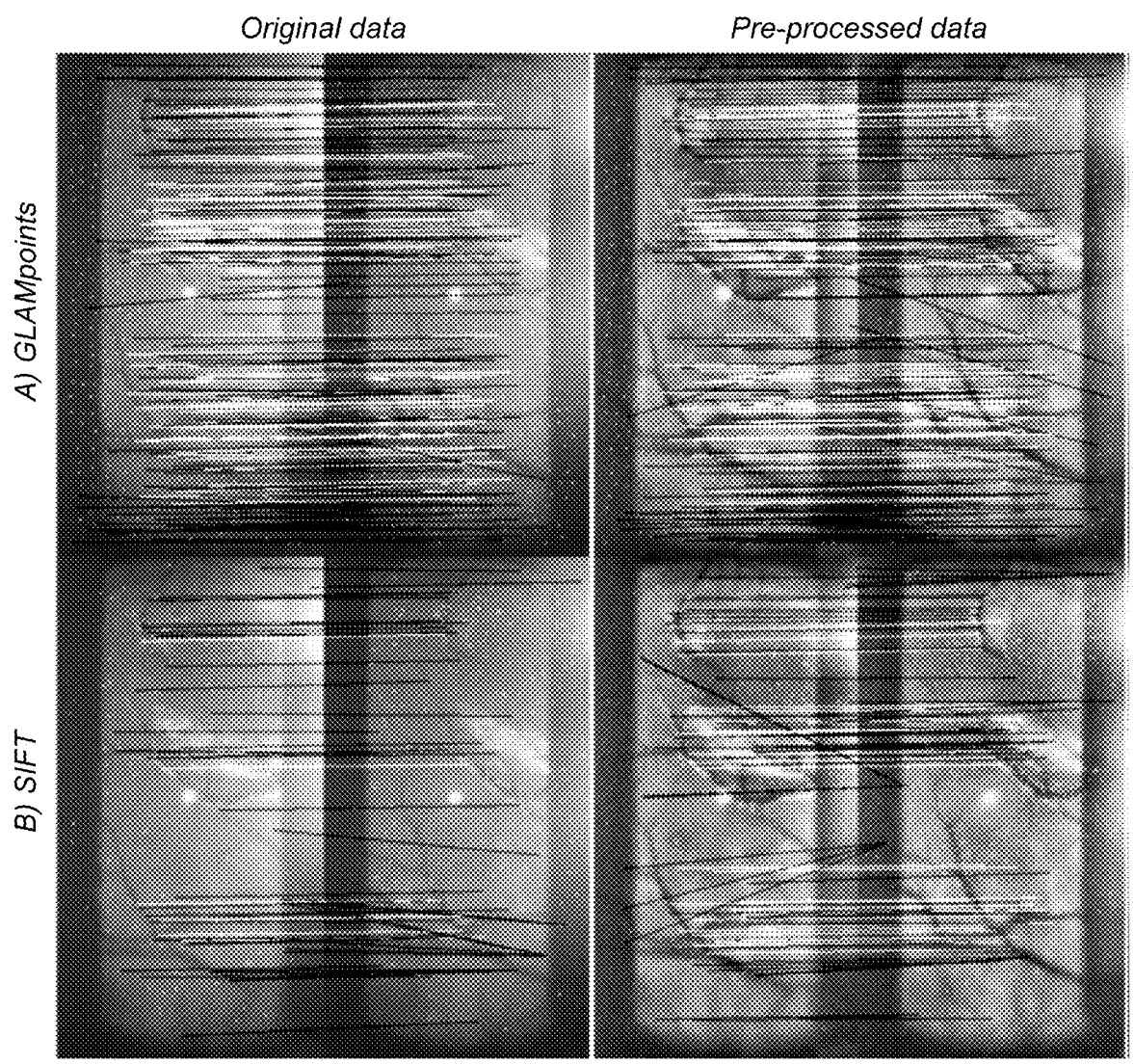
FIG. 1 illustrates how points may be matched in a practical example.

Certain exemplary embodiments will be described in greater detail, with reference to the accompanying drawings and paper.

The matters disclosed in the description, such as detailed construction and elements, are provided to assist in a comprehensive understanding of the exemplary embodiments. Accordingly, it is apparent that the exemplary embodiments can be carried out without those specifically defined matters. also, well-known operations or structures are not described in detail, since they would obscure the description with unnecessary detail.

Techniques disclosed herein can be applied to image registration in any application domain.

Known fully supervised machine learning solutions to this problem need manually annotated ground truths, which relate positions from images from two separate view points. While in natural images the ground truth can be created in a static setup, medical data is highly dynamic and involves patients. This renders the acquisition of the ground truth from very hard to infeasible.

The distribution of features detected by most feature detectors or keypoint detectors is concentrated on edges and corners. In the medical field large areas are usually featureless, which leads to clumping of feature points and consequently to matches that lead to imprecise transformations.

The following aspects are mentioned as examples.
1. Training is performed on final matching success on the target domain, in contrast to prior art using indirect metrics such as repeatability.
2. The Algorithm is trained on only synthetic augmentation, solving the issue for ground truth data. It allows to train a detector solely with the target data.
3. Feature points are evenly distributed over the whole image.

The following advantages may be realized partially or completely:
1. By using certain embodiments of the invention, feature point detectors can be learned and optimized for a specific otherwise not viable imaging domain. Moreover, a good feature descriptor can be reused.
2. There is no need for a ground truth, only samples from the target domain are needed.
3. No pre-processing or manual crafting of features is needed to achieve better matching rates.
4. With an even distribution of feature points (and matches) the precision of estimated transformations between two images is greatly increased.

The following further advantages may be realized partially or completely:
1. If more data is available from the target domain, it can be used to improve the detector further.
2. The detector can be optimally fitted to the descriptor algorithm. If a better descriptor is found, a new detector can be trained without additional implementation cost or data.

An aspect of the invention is a training procedure to train a model to detect feature points in images. This training procedure can be applied for any kind of images. This can be, for example, in the medical field, for satellite imagery or outdoor images. Images may also be made by a mobile phone or handheld camera, ultrasound device, or ophthalmologic slit lamp imaging device.

For example, the images can be 2D images or 3D images. In case of 2D images, 2D (or 1D) features may be detected and coordinates of points may be two-dimensional. In case of 3D images, 1D, 2D or 3D features may be detected and coordinates of points may be three-dimensional.

For example, the images can be 1D images. In case of 1D images, 1D features may be detected and coordinates of points may be one-dimensional. In general, the images can be N-dimensional for any positive integer N.

For example, the images are photographs or X-ray images.

For example, the feature points detected by the model may be used for image registration.

An aspect of the invention is a method or apparatus to find the optimal feature point detection for a particular feature point descriptor. In that sense, the algorithm finds points of interest in the image that optimize the matching capabilities of the target descriptor algorithm. This target descriptor algorithm can be root SIFT, for example, as described in the accompanying paper, but can be any other descriptor such as ORB, BRISK, BRIEF, etc.

In the following description, the terms interest point and key point are used interchangeably.

The following steps may be used to train the model.

1. Given a pair of images $I \in R^{H \times W}$ and $I' \in R^{H \times W}$ related with the ground truth homography $H = H_{I,I'}$, the model may provide a score map for each image:

$S = f_\theta(I)$ and $S' = f_\theta(I^0)$.

In this step, two images I and I' may be generated from the original image using the two homography transformations $H_I$ and $H_{I'}$, respectively. The homography between those two images is then $H = H_I^* H_{I'}$. For example, the homography transformations $H_I$ and $H_{I'}$ may be generated randomly using a random generator. Two keypoint probability maps S and S' are generated using the model $f_\theta$ as follows: $S = f_\theta(I)$ and $S' = f_\theta(I')$.

2. The locations of interest points may be extracted on both score maps using standard non-differentiable Non-Max-Supression (NMS), with a window size w. In this step, the locations of interest points may be extracted on both score maps S, S' using non-maximum suppression with a window size w. This means that only the maximum value is retained locally in all squares w×w, and all other values are set to 0. This results in distinct sparse points across the image. In other words, the number of keypoints is reduced, as only the maximum value keypoint is retained in each square w×w of the keypoint probability maps S and S'.

The window size w may be selected by trial and error. This width w may be given beforehand (a fixed algorithm parameter), or may be determined dynamically based on the image I at hand.

It will be understood that this is an optional step in the procedure. Moreover, alternative algorithms may be used to replace standard non-differentiable NMS.

3. A 128 root-SIFT feature descriptor may be computed for each detected keypoint. In this step, for example, using the root SIFT descriptor algorithm we assign a feature descriptor vector to each keypoint found in step 2. The feature descriptor vector may have, for example, a length of 128. Other lengths may be used alternatively. As mentioned elsewhere in this document, another type of feature descriptor may be used alternatively.

For example, the feature descriptor is computed based on the image information present in the image I or I'. For example, the SIFT feature descriptor describes the image gradients in the image I or I' around a keypoint.

4. The keypoints from image I may be matched to those of image I' and vice versa using a brute force matcher, for example [1]. For example, only the matches that are found in both directions are kept. In this step, the keypoints from image I may be matched to those of image I' using the closest descriptor computed in step 3) of the other image I'. To this end, the descriptor outputs calculated for keypoints of image I may be compared to the descriptor outputs calculated for keypoints of image I'. Herein, the "closest descriptor" means the most similar descriptor output, according to a predefined similarity measure. In certain implementations, if the second-closest point has a very similar descriptor, the match is discarded.

Matching can be performed in both directions (from image I to image I' and from image I' to image I). Only the matches that are found in both directions are kept in. In alternative implementations, some or all of the matches that are found in only one direction may be kept in the set of matches.

Any suitable kind of matcher may be used. This step is not limited to a brute force matcher.

In certain implementations, the matching of step 4 is performed based on the output of the descriptor in both images I and I', without taking into account the ground truth homography H (or $H_I$ or $H_{I'}$).

5. The matches are checked according to the ground truth homography H. A match is defined as true positive if the corresponding keypoint x in image I falls into an-neighborhood of the point $x^0$ in $I^0$ after applying H. This may be formulated as:

$\|H^* x - x'\| \le \varepsilon$, where ε may be chosen, for example, as 3 pixels. Let T denote the set of true matches.

In this step, for all matching points found in step 4), the matching points of image I are transformed to points of the image I' using the homography H. For example, the coordinates of a matching point in image I are transformed to corresponding coordinates of a point in image I', using the homography H. In certain embodiments, only a subset of the matching points found in step 4) are transformed.

A match may be defined as true positive if the keypoint x in image I, after the transformation using the homography H to obtain the ground truth corresponding point in image I', is sufficiently close to the matching point x' that was found in step 4. For example, 'sufficiently close' may be defined as meaning that the ground truth corresponding point of keypoint x has a distance less than a certain threshold epsilon from the matching point x'. This distance may be, for example, a Euclidean distance. In certain implementations, epsilon may be 3 pixels. However, this is not a limitation.

The model $f_\theta$ may be a neural network, for example a convolutional neural network. however, this is not a limitation. In alternative embodiments other types of model may be used, such as statistical model.

According to an aspect of the invention, steps 2, 3, 4, and/or 5 may be used to train the model. This training may involve backpropagation of the model or neural network.

For example, the function to be optimized by the training procedure (i.e. the cost function or loss) may be based on the matches found in step 5.

Thus, the matching ability of keypoints may be optimized. A loss function may be provided as follows:

$L_{simple} = (f_\theta(I) - R)^2$, wherein the reward matrix R can be defined as follows:

$$R_{x,y} \in \mathbb{R}^{H \times W} = \begin{Bmatrix} 1, & \text{for } (x, y) \in T \\ 0, & \text{otherwise} \end{Bmatrix}.$$

However, a drawback of the formulation of $L_{simple}$ above paper may be, in some cases, a relatively large class imbalance between positively rewarded points and null-rewarded ones, where latter prevails by far, especially in the first stages of training. Given a reward R with mostly zero values, the model $f_\theta$ may converge to a zero output instead of the desired indication of key points corresponding to image features for registration.

Preferably, to counteract the imbalance, we use sample mining: we select all n true positive points and randomly sample an additional number n of points from the set of false positives, rather than all false positives. We only back-propagate through the 2n true positive feature points and mined false positive key points.

Alternatively, the number of true positive points and false positive points used for back-propagating does not have to be identical. It may be sufficient if the number of false positive points is reduced to a certain extent in relation to the number of true positive points.

This way, the number of true positive key points and false positive key points is (about) the same. This may help to avoid an imbalance in the number of true positive samples and false positive samples.

If there are more true positives than false positives, gradients may be backpropagated through all found matches.

This mining may be mathematically formulated as a mask M, equal to 1 at the locations of the true positive key points and at the locations of the (random) subset of mined (false positive) feature points, and equal to 0 otherwise.

The loss may thus be formulated, for example, as follows:

$$L = \Sigma (f_\theta(I) - R)^2 \cdot M,$$

Preferably, the loss may be formulated as the mean of the loss for each of the participating feature points according to the mask M:

$$L = \frac{\Sigma (f_\theta(I) - R)^2 \cdot M}{\Sigma M}$$

where the dot denotes the element-wise multiplication and the superscript-2 means element-wise square and the minus means element-wise subtraction, and the summation is over all elements of the matrix. The output of the model $f_\theta$ may indicate a probability or likelihood that the point is a key point.

Preferably, the loss function is calculated based only on points that are found as matches according the feature descriptor. In certain applications, better and/or more stable results may be achieved by not training on true negatives.

Step 2 may help to distribute the keypoints more regularly over the image. For example, a fixed non-maximum suppression window with width w and height h over the keypoint probability map ensures that the maximal distance between two keypoints is 2*w in x direction and 2*h in y direction. For example, the width w of the window may be equal to the height h of the window. Alternatively, it is also possible to make the window size dependent on the image, for example on the amount of information in the image.

The descriptor generated in step 3 may be used to match keypoints of image I to keypoints of image I', based on a similarity between a descriptor of a feature present at the keypoint in the respective image.

Different types of descriptor may be used. For example SIFT may be a suitable descriptor (which has both a detector and descriptor component).

In general, the matching may be performed in three steps:
1) detecting interesting feature points in two images;
2) generating a unique description (feature vector) of each detected feature point; and
3) matching feature points from one image to feature points of the other image using a similarity or distance metric (such as the Euclidean distance) between the feature vectors.

An advantage of the present method may be that it may be not necessary to perform pre-processing of the image before generating the keypoint probability map. When using the model or neural network to generate the keypoint probability map in step 1, the model or neural network may learn to do the preprocessing implicitly in the optimization process for better keypoints.

In the described examples, images are transformed synthetically (using the random homography) to create a training set. However, the method can also be used to train on real data pairs. For example, the ground truth homography H may then be determined by a human observer or in another way.

A network trained using the techniques disclosed herein can predict the location of stable interest points, called GLAMpoints, on a full-sized gray-scale image. Hereinafter, examples of the generation of the used training set and training procedure are disclosed. As standard convolutional network architectures may be employed, we only briefly discuss these architectures in the end.

A study has been performed by the inventors that focused on digital fundus images of the human retina which are widely used to diagnose a variety of eye diseases, such as Diabetic Retinopathy (DR), glaucoma, and Age-related Macular Degeneration (AMD) [37, 47]. For retinal images acquired during the same session and presenting small overlaps, registration can be used to create mosaics depicting larger areas of the retina. Through image mosaicking, ophthalmologists can display the retina in one large picture, which is helpful to assist them during diagnosis and treatment planning. Besides, mosaicking of retinal images taken at different times has been shown to be important for monitoring the progression or identification of eye diseases. More importantly, registration applications have been explored in eye laser treatment for DR. They allow real-time tracking of the vessels during surgical operations to ensure accurate application of the laser on the retina and minimal damage to healthy tissues.

Mosaicking usually relies on extracting repeatable interest points from the images and searching for transformations relating them. As a result, the keypoint detection is the most crucial stage of this pipeline, as it conditions all further steps and therefore the success of the registration.

At the same time, classical feature detectors are general-purpose and manually optimized for outdoor, in-focus, low-noise images with sharp edges and corners. They usually fail to work on medical images, which can be magnified and distorted, noisy, have no guarantee of focus and depict soft tissue with no sharp edges (see FIG. 3).

Figure 3:
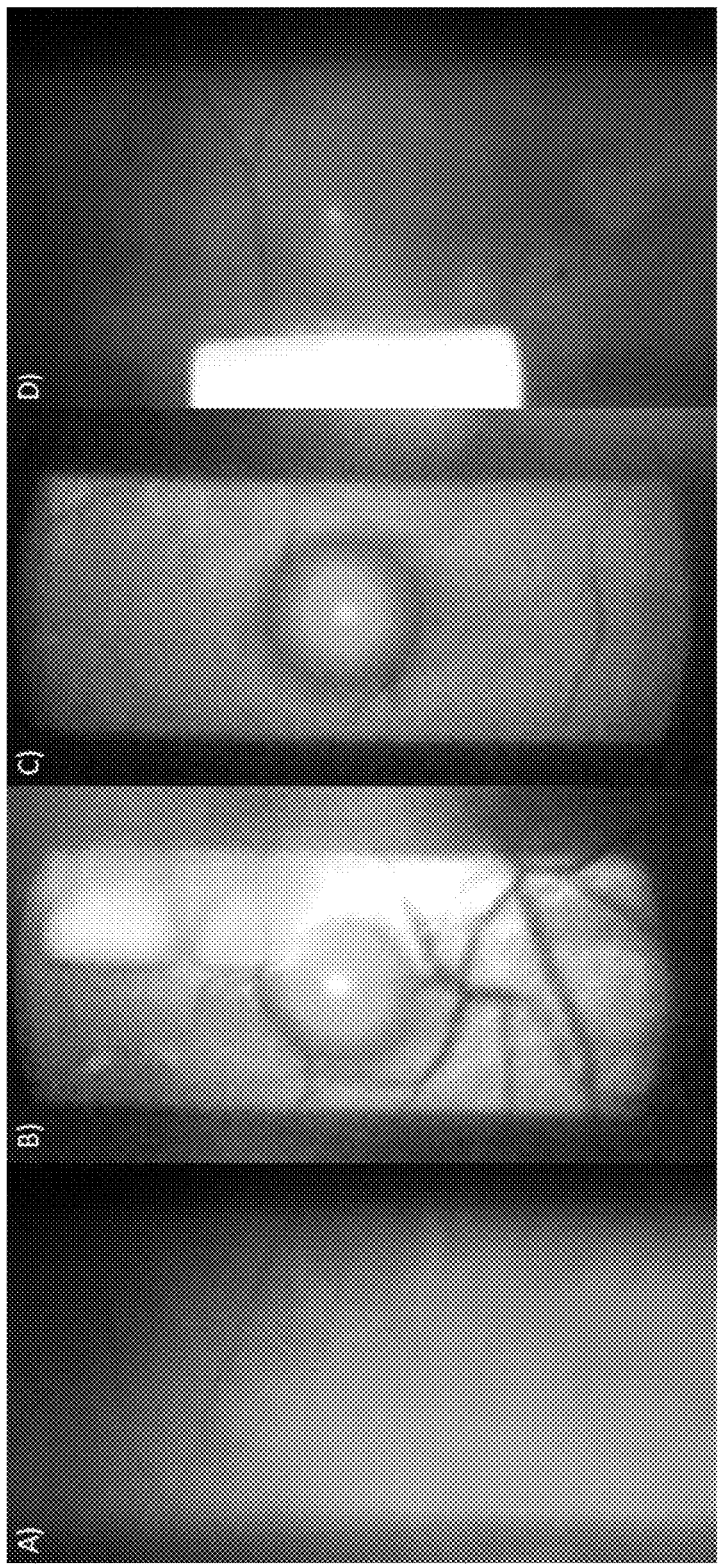
FIG. 3 shows examples of images from the slit lamp dataset.

FIG. 3 shows examples of images from the slit lamp dataset showing challenging conditions for registration. A) Low vascularisation and over-exposure leading to weak contrasts and corners, B) Motion blur, C) Focus blur, D) Acquisition artifacts and reflections.

On those images, traditional methods perform sub-optimally making more sophisticated optimization necessary at a later step in the registration, such as Random Sampling Consensus (RanSaC) [20], bundle adjustment [38] and Simultaneous Localization and Mapping (SLAM) [18] techniques. In these cases, supervised learning methods fail or are not applicable, due to missing ground truths for feature points.

In this disclosure a method is disclosed to learn feature points in a semi-supervised manner. Learned feature detectors were shown to outperform heuristics-based methods, but they are usually optimized for repeatability and as a result they may underperform during the final matching. On the contrary, according to the present disclosure, the keypoints, called GLAMpoints, may be trained for the final matching ability and when associated with, for example, a Scale-Invariant Feature Transform (SIFT) descriptor they outperform state-of-the-art in matching performance and registration quality.

FIG. 1 shows an example of detected keypoints and matches of the keypoints between a pair of slit lamp images. First column shows original images while second column depicts pre-processed data. Detected points are shown in white. White lines denote true positive matches, whereas black lines denote false positive matches.

As shown in in FIG. 1, GLAMpoints (shown at row A) produces many more correct matches than SIFT (shown at row B). Registration based on feature points is inherently non-differentiable due to point matching and transformation estimations. Using Reinforcement Learning (RL) this issue may be avoided, by assuming detected points to be decisions in the classical RL sense. It makes it possible to use the key performance measure, i.e. matching power, directly to train a Convolutional Neural Network (CNN) specialized in a specific image modality.

The trained network may predict the location of stable interest points on a full-sized gray-scale image. These interest points are referred to herein as "GLAMpoints". In the following, a method for the generation of the training set and a training procedure is disclosed. As it is possible to use a standard convolutional network architecture, this architecture is only briefly discussed in the end.

As an example, a training set from the ophthalmic field was selected, namely slit lamp fundus videos, used in laser treatment. In this application, live registration is performed for an accurate ablation of retinal tissue. The exemplary training dataset consists of images from a base set of 1336 images with different resolutions, ranging from 300 pixels to 700 pixels by 150 pixels to 400 pixels. These images were taken from multiple cameras and devices to cover large variability of imaging modalities. They come from eye examination of 10 different patients, who were healthy or with diabetic retinopathy. The full resolution samples were scaled to 256 by 256 pixels by padding with zeros or random cropping on the larger images. This reduction of size was performed to speed up the training process and to increase the number of images. However, it is noted that the above-mentioned dimensions and the content of the training set are provided herein merely as non-limiting examples.

Let B be the set of base images of size H×W. At every step i, an image pair $I_i$, $I'_i$ is generated from an original image $B_i$ by applying two separate, randomly sampled homography transforms $g_i$, $g'_i$. Images $I_i$ and $I'_i$ are thus related according to the homography $H_{I_i,I'_i}=(g'_i*g)i^{-1}$. A method of homography generation is elaborated elsewhere in this description.

On top of the geometric transformations, standard data augmentation may be used: gaussian noise, changes of contrast, illumination, gamma, motion blur and the inverse of image. A subset of these appearance transformations may be randomly chosen for each image I and I'. In certain embodiments, different geometric and appearance transformations are applied to the base images at each step, such that the network never sees any same image pair twice.

To train the feature point detector, certain features from classical reinforcement learning (RL) may be employed. RL is concerned with estimating probabilities of actions in an environment to maximize a reward over a number of steps. Feature point detection can be seen as taking a single action at every position of the image, namely selecting it either as a feature point or as background. A learned function may be defined as $$f_\theta(I) \to S,$$

where S denotes a map of pixel-wise feature point probability. Lacking a direct ground truth of keypoint locations, a reward can be computed instead. This reward may be based on the matching success. This matching success may be computed after classical matching steps in computer vision.

The training may proceed as follows:
1. Given a pair of images $I \in \mathbb{R}^{H \times W}$ and $I' \in \mathbb{R}^{H \times W}$ related with the ground truth homography $H=H_{I,I'}$, the model may provide a score map for each image: $S=f_\theta(I)$ and $S'=f_\theta(I^0)$.
2. The locations of interest points may be extracted on both score maps using standard non-differentiable Non-Max-Supression (NMS), with a window size w.
3. A 128 root-SIFT feature descriptor may be computed for each detected keypoint.
4. The keypoints from image I may be matched to those of image I' and vice versa using a brute force matcher, for example [1]. For example, only the matches that are found in both directions are kept.
5. The matches are checked according to the ground truth homography H. A match is defined as true positive if the corresponding keypoint x in image I falls into an-neighborhood of the point $x^0$ in $I^0$ after applying H. This is formulated as:

$$\|H*x-x'\| \le \varepsilon$$

where ε may be chosen, for example, as 3 pixels. Let T denote the set of true matches.

In the classical RL framework, if a given action is taken—that is a feature point is selected—and ends up in the set of true positive points, it gets a positive reward. All other points/pixels are given a reward of 0. Then the reward matrix R can be defined, for example, as follows:

$$R_{x,y} \in \mathbb{R}^{H \times W} = \begin{cases} 1, & \text{for } (x, y) \in T \\ 0, & \text{otherwise} \end{cases}$$

This leads to the following loss function:

$$L_{simple}=(f_\theta(I)-R)^2.$$

However, a major drawback of this formulation is the large class imbalance between positively rewarded points and null-rewarded ones, where latter may prevail by far, especially in the first stages of training. Given a reward R with mostly zero values, the $f_\theta$ may converge to a zero output. Hard mining has been shown to boost training of descriptors [37]. Negative hard mining on the false positive matches might also enhance performances in our method, but has not been investigated in this work. Instead, to counteract the imbalance, sample mining may be used: all n true positive points and additional n may be randomly sampled from the set of false positives. Back-propagation may be performed through the 2n true positive feature points and mined false positive key points. In certain embodiments, back-propagation is only performed through the 2n true positive feature points and mined false positive key points. If there are more true positives than false positives, gradients may be backpropagated through all found matches. This mining may be mathematically formulated as a mask M, equal to 1 at the locations of the true positive key points and that of the subset of mined feature points, and equal to 0 otherwise. The loss may thus be formulated as follows:

$$L(\theta, I) = \frac{\Sigma(f_\theta(I) - R)^2 \cdot M}{\Sigma M},$$

where the symbol · denotes the element-wise multiplication.

Figure 2A:
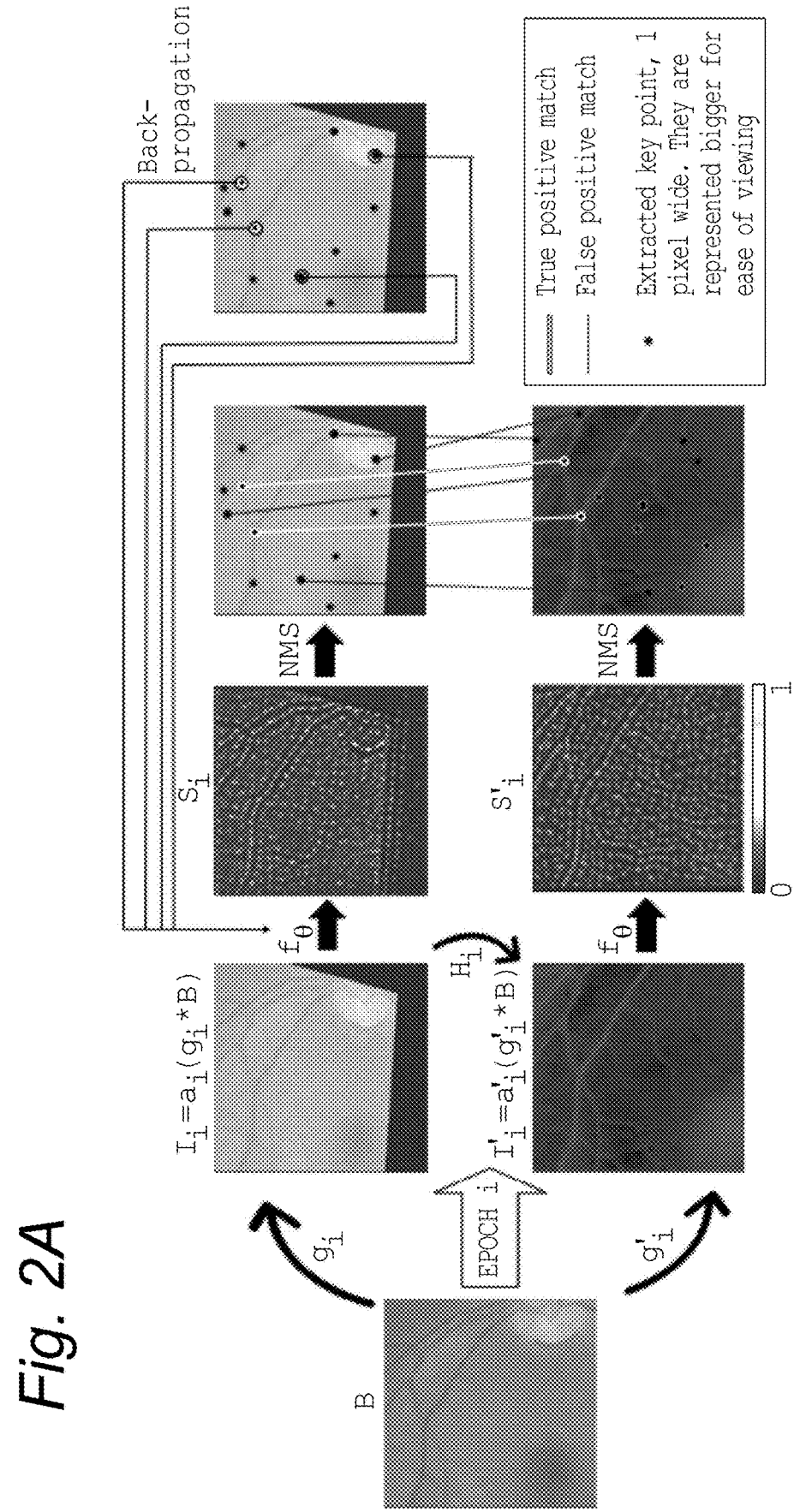
FIG. 2A shows an example of steps of training for an image pair.
Figure 2B:
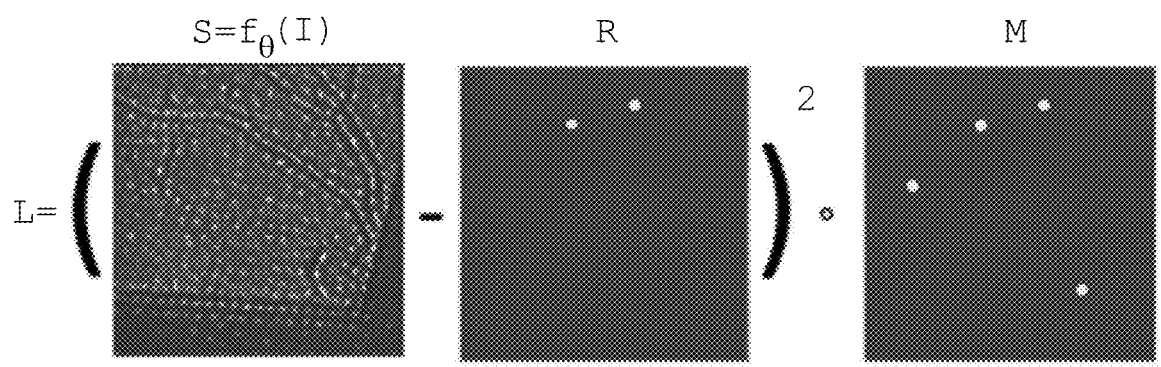
FIG. 2B shows an example of loss computation.
Figure 2C:
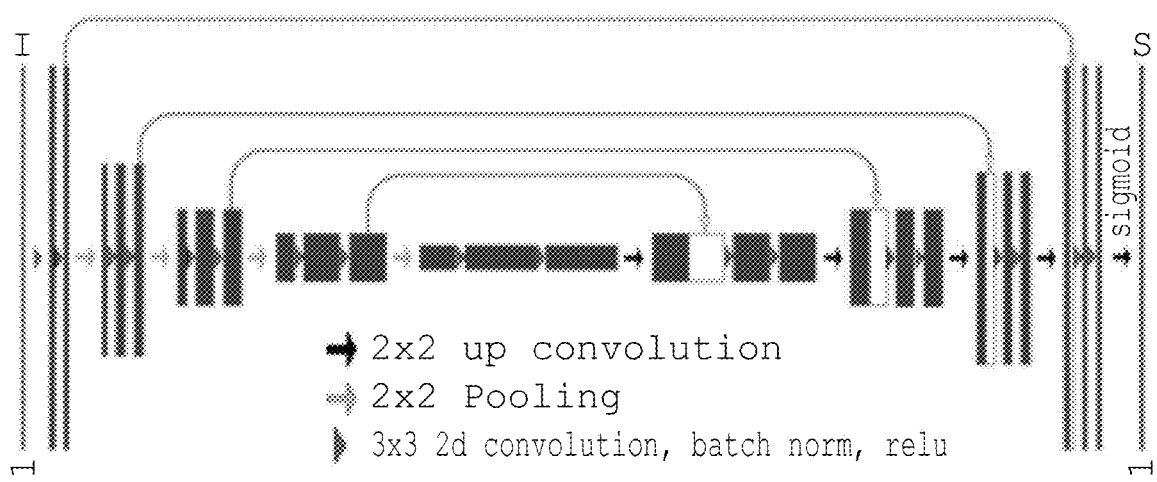
FIG. 2C shows an example schematic representation of Unet-4.

FIG. 2A shows steps of training for an image pair I and I' at epoch i for a particular base image B. FIG. 2B shows an example of loss computation. FIG. 2C shows a schematic representation of Unet-4.

An overview of the training steps is given in FIG. 2. Importantly, it may be observed that only step 1 is differentiable with respect to the loss. The learning takes place directly on a reward which is the result of non differentiable actions, without supervision. It may be noted that the descriptor used is the SIFT version without rotation invariance. The reason is that SIFT detector/descriptor rotation-dependent performs better than SIFT detector/descriptor with rotation invariance on slit lamp images. The aim of the evaluation was to investigate the detector only and therefore the SIFT descriptor rotation-dependent was used for consistency.

A standard 4-level deep Unet [34] with a final sigmoid activation was used to learn $f_\theta$. It comprises 3×3 convolution blocks with batch normalization and Rectified Linear Unit (ReLU) activations (see FIG. 2C). Since the task of keypoint detection is similar to pixel-wise binary segmentation (class interest point or not), Unet models seemed promising due to their past successes in binary and semantic segmentation tasks.

In the following, a description is provided of a testing dataset and an evaluation protocol. State of the art detectors are compared quantitatively and qualitatively to the techniques disclosed herein, such as GLAMpoints.

In this study, the trained model was tested on several fundus image datasets and on natural images. For the medical images, two datasets were used:

First, the 'slit lamp' dataset: From retinal videos of 3 different patients, a random set of 206 frame pairs was selected as testing samples, with sizes 338 pixels (px) to 660 px by 190 px to 350 px. Examples are shown in FIG. 3 and as can be seen they present multiple artefacts making it a particularly challenging dataset. The pairs were selected to have an overlap ranging from 20 to 100%. They are related by affine transformations and rotations up to 15 degrees. Using a dedicated software tool (Omniviewer 1), all pairs of images were manually annotated with at least 5 corresponding points. Those landmarks were used to estimate the ground truth homographies relating the pairs. To ascertain correct matching, an expert has verified every estimated homography and rectified incorrect matches.

Second, the FIRE dataset [22]. This is a publicly available retinal image registration dataset with ground truth annotations. It consists of 129 retinal images forming 134 image pairs. The original images of 2912×2912 pixels were downscaled to 15% of their original size, to have a similar resolution as the training set. Examples of such images are presented in FIG. 5.

For testing on fundus images, as pre-processing, we isolated the green channel, applied adaptive histogram equalization and a bilateral filter to reduce noise and enhance the appearance of edges. The effect of pre-processing can be observed in FIG. 1. This process leads to improved results during detection and description according to De Zanet et al. [46]. However, GLAMpoints works well both on original and pre-processed images. Therefore, to compare the performance, we present the evaluation results in both cases.

Moreover, keypoint detection and matching were also performed on natural images. For this, the following were used: the Oxford dataset [30], EF dataset [48], Webcam dataset [40, 24], and ViewPoint dataset [45], leading to 195 pairs in total. These datasets may lead to a total of 195 pairs. More details are given elsewhere in this description.

Evaluation criteria considered include the following: repeatability, mean number of detected keypoints, and success rate. These will be elaborated in the following.

1. Repeatability describes the percentage of corresponding points that appear on both images:

$$\frac{|\{x \in P, x' \in P' \mid \|H_{I,I'} * x - x'\| < \varepsilon\}|}{|P| + |P'|}$$

The sets of detected points are denoted as P, P' respectively for images I and I', with corresponding key points x and x'. $H_{I,I'}$ is the ground truth homography relating the reference image to the transformed one. ε is the distance cutoff between two points (set to 3 pixels).

2. Mean number of detected keypoints per image: Matches were found using the Nearest Neighbor Distance Ratio (NNDR) strategy, as proposed in [28]: two keypoints are matched if the descriptor distance ratio between the first and the second nearest neighbor is below a certain threshold t. In terms of matching performances, the following metrics were evaluated:
   (a) AUC, which is the area under the Receiving Operating Characteristic (ROC) curve (created by varying the value of t). This allows to evaluate the discriminating power of each method, in line with [15, 43, 42].
   (b) Matching Score, defined as the ratio of correct matches over the total number of features extracted by the detector in the shared viewpoint region [29]. This metric allows to evaluate the entire feature pipeline performance.
   (c) Coverage fraction, which measures the coverage of an image by correctly matched key points. To compute it, the technique proposed in [7] was adopted: a coverage mask was generated from correctly matched key points, each one adding a disk of fixed radius (25 px).

The homography $\hat{H}$ relating the reference to the transformed image was computed by applying RanSaC algorithm to remove outliers from the detected matches. All metrics stated above refer to the matching performance.

3. Success rate: the registration quality and accuracy achieved by each detector was evaluated, as in [13, 41]. To do so, we compared the reprojection error of six fixed points of the reference image, denoted as $$c_i, i=\{1, \ldots 6\},$$

onto the other. For each image pair for which a homography was found, the quality of the registration was assessed with the median error MEE, the maximum error MAE as well as the root mean squared error RMSE of the correspondences. Using these metrics, we defined different thresholds on MEE and MAE that define "acceptable" registrations and "inaccurate" registrations. For the slit lamp dataset, we classified the image pairs as "acceptable" registrations when (MEE<10 and MAE<30) and as "inaccurate" registrations otherwise. On the other hand, for the full-retinal images from the FIRE dataset [22], "acceptable" registrations correspond to (MEE<1:50 and MAE<10). The values for the thresholds were found empirically by post viewing the results.

Finally, the success rate of each class was calculated, equal to the percentage of image pairs for which the registration falls into each category. These metrics may be considered the most important quantitative evaluation criteria of the overall performance in a real-world setting.

To evaluate the performance of the detector associated with root-SIFT descriptor, matching ability and registration quality were compared against well known detectors and descriptors. Among them, SIFT [2], root-SIFT [28, 8], KAZE [6] and LIFT [44] were shown to perform well on fundus images by Truong et al. [39]. Moreover, the method was compared to other CNN-based detectors-descriptors: LF-NET [31] and SuperPoint [16]. The inventors used their implementation of LIFT (pretrained on Picadilly), SuperPoint and LF-NET (pretrained on indoor data, which may give substantially better results on fundus images than the version pretrained on outdoor data) and OpenCV implementation for SIFT and KAZE. A rotation-dependent version of Root-SIFT may be used due to its better performance on our test set compared to the rotation invariant version.

Training of GLAMpoints was performed using Tensorflow [4] with mini-batch size of 5 and the Adam optimizer [25] with default parameters of learning rate=0:001 and β=(0.9, 0.999). The model was 4-fold cross-validated, showing similar results with a standard deviation of 1% in the success rate. It was then retrained on the whole dataset, comprising 8936 base images for 35 epochs. GLAMpoints (NMS10) was trained and tested with a NMS window equal to 10 px. It must be noted that other NMS windows can be applied, which obtain similar performance.

TABLE 1

Success rates per registration class (%) for each detector on the 206 images of the slitlamp dataset. Acceptable registrations are defined as having (MEE < 10 and MAE < 30). Best results are indicated in bold.

|  | Failed [%] | Inaccurate [%] | Acceptable [%] |
|---|---|---|---|
| a) Non pre-processed data | | | |
| SIFT | 14.56 | 63.11 | 22.33 |
| KAZE | 24.27 | 61.65 | 14.08 |
| SuperPoint | 17.48 | 48.54 | 33.98 |
| LIFT | 0.0 | 43.69 | 56.31 |
| LF-NET | 0.0 | 39.81 | 60.19 |
| GLAMpoints (NMS10) | 0.0 | 36.41 | 63.59 |
| b) Pre-processed data | | | |
| SIFT | 1.94 | 47.57 | 50.49 |
| KAZE | 1.46 | 54.85 | 43.69 |
| SuperPoint | 7.77 | 51.46 | 40.78 |
| LIFT | 0.0 | 39.81 | 60.19 |
| LF-NET | 0.0 | 36.89 | 63.11 |
| GLAMpoints (NMS10) | 0.0 | 31.55 | 68.45 |

Table 1 presents the success rate of registration evaluated on the slit lamp dataset. Without pre-processing, most detectors used for comparison show lower performance than on pre-processed images. In comparison, the presented model performs well on unprocessed images. This is highlighted in Table 1, where while the success rate of acceptable registrations (A) of SIFT, KAZE and SuperPoint drops by 20 to 30% between pre-processed and non pre-processed images, that of the GLAMpoints as well as LIFT and LF-NET only present a decrease of 3 to 6%. Besides, LF-NET, LIFT and GLAMpoints detect a steady average number of keypoints (around 485 for the first and 350 for the laters) independently of the pre-processing whereas the other detectors see a reduction of factor 2.

In tested embodiments, GLAMpoints may outperform KAZE, SIFT and SuperPoint by at least 18% in success rate of acceptable registrations. In the same category, it overcomes LF-NET and LIFT by respectively 3 and 5% and 7 and 8% on original and pre-processed data. It is also important to note that while LF-NET might reach similar results for this particular metric and dataset if it was trained on fundus images, its training procedure makes use of images pairs with their relative pose and corresponding depth maps, which would be extremely difficult—if not impossible—to get for fundus images.

Moreover, independently of the pre-processing, GLAMpoints models have the smallest MEE and RMSE in inaccurate registrations (I) as well as globally for successful registrations. For all detectors, MEE and RMSE of acceptable registrations are similar within 1 pixel. The details of corresponding MEE and RMSE per class can be found elsewhere in this description. The robust results for GLAMpoints independently of pre-processing indicate that while the detector performs as well, if not better, than SIFT on good quality images, its performance does not drop with low quality, weakly contrasted images.

While SIFT extracts a large number of keypoints (205.69 on average for unprocessed images and 431.03 for preprocessed), they appear in clusters. As a result, even if repeatability is relatively high (many possible valid matches), the close positioning of the interest points leads to a large number of rejected matches, because of Nearest Neighbor Distance Ratio (NNDR), and to few true positive ones, which is evidenced by the low coverage fraction apparent from FIG. 4. It results in a small M:score and AUC. With a similar value of repeatability, our approach extracts interest points widely spread and trained for their matching ability (highest coverage fraction), resulting in more true positive matches (second highest M.score and AUC), as can be seen in FIG. 4.

Figure 4A:
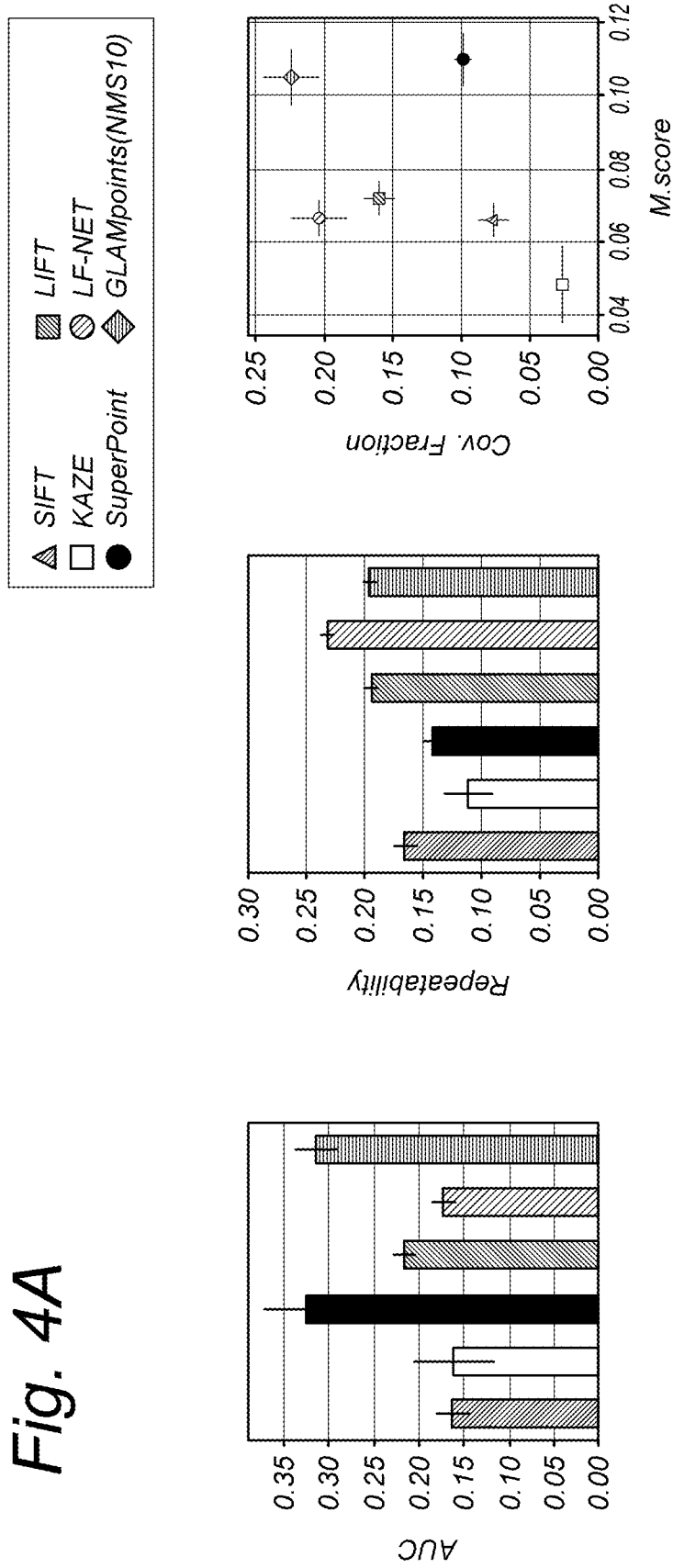
FIG. 4A shows a summary of detector/descriptor performance metrics evaluated over 206 pairs of the slit lamp dataset, using non pre-processed data.
Figure 4B:
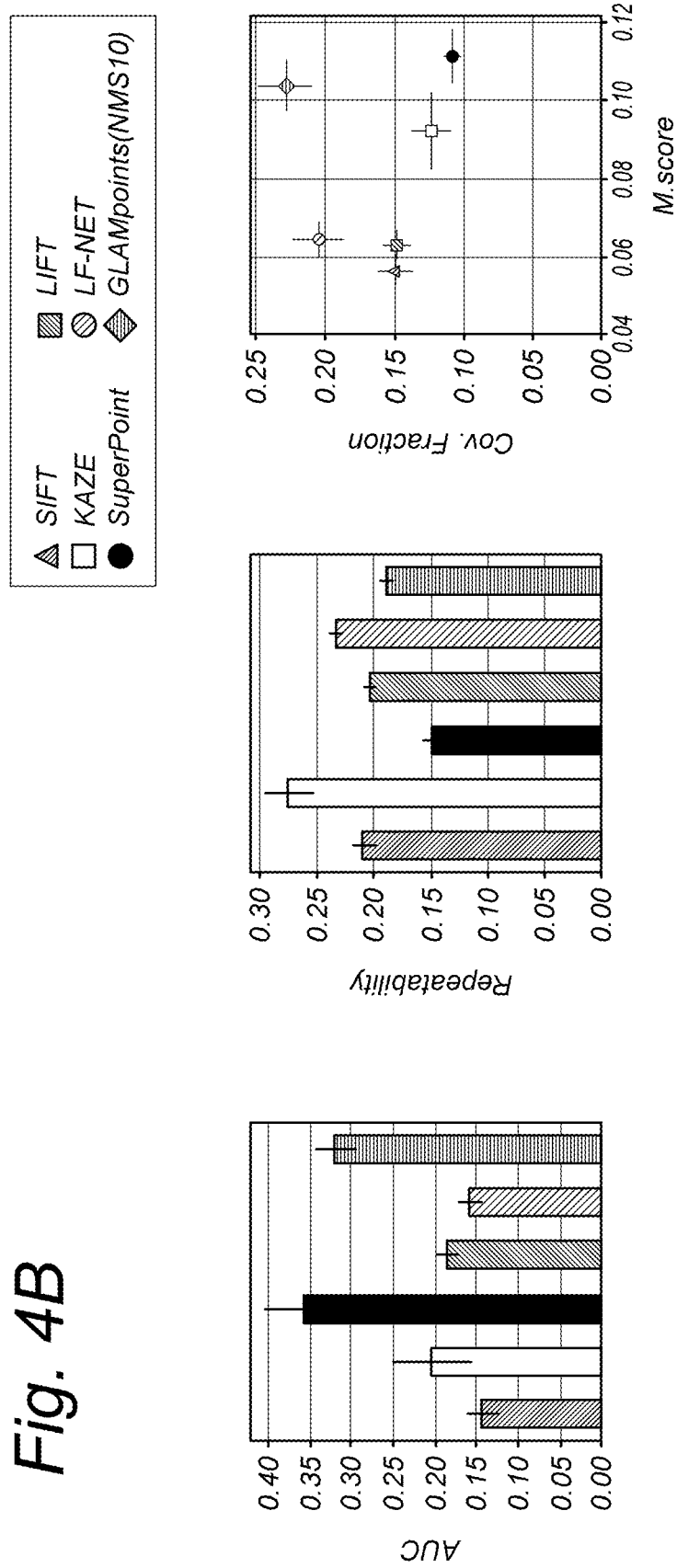
FIG. 4B shows a summary of detector/descriptor performance metrics evaluated over 206 pairs of the slit lamp dataset, using pre-processed data.

FIG. 4 provides a summary of detector/descriptor performance metrics evaluated over 206 pairs of the slit lamp dataset. FIG. 4A shows results for non pre-processed data, whereas FIG. 4B shows results for pre-processed data.

It may also be noted that SuperPoint scored with the highest M:score and AUC even if it has a relatively small coverage fraction (see FIG. 4). However, M:score and AUC are in this case artificially inflated because Super-Point detects very few keypoints (35,88 and 59,21 on average respectively for non pre-processed and pre-processed images) and has the one of the lowest repeatability, leading to few possible correct matches. Then its matching performance appears high, even though it does not find many true positive matches. This is evidenced by the large number of inaccurate and failed registrations (48.54 and 17.48% for unprocessed data, and 51.46 and 7.77% for pre-processed images, Table 1).

Finally, it is noticeable that LF-NET scored with a very high repeatability (highest on original data and second largest on pre-processed images), but its M.score and AUC are in the bottom part of the ranking (FIG. 4). It can be explained by the training of LF-NET detector, which privileged repeatability over matching objectives.

TABLE 2

Success rates (%) for each detector on non preprocessed images of the FIRE dataset. Acceptable registrations are defined as having (MEE < 1:5 andMAE < 10). Best results are indicated in bold.

|  | Failed [%] | Inaccurate [%] | Acceptable [%] |
| --- | --- | --- | --- |
| SIFT | 2.24 | 91.79 | 5.97 |
| KAZE | 14.10 | 84.33 | 1.49 |
| SuperPoint | 0.0 | 53.73 | 46.27 |
| LIFT | 0.0 | 57.46 | 42.54 |
| LF-NET | 0.0 | 73.88 | 26.12 |
| GLAMpoints (NMS10) | 0.0 | 52.99 | 47.01 |

GLAMpoints were also evaluated on the FIRE dataset. As all the images present a good quality with highly contrasted vascularisation, there is no need to apply preprocessing. Table 2 shows the success rates of registrations. The mean and standard deviation of MEE and RMSE per class can be found elsewhere in this description. The presented method outperformed both in terms of success rate and global accuracy of non-failed registrations. It is interesting to note the gap of 41.04% in the success rate of acceptable registrations between GLAMpoints and SIFT. As both use the same descriptor (SIFT), this difference is only explained by the detector. Indeed, as can be seen on FIG. 5, while SIFT detects a restricted number of keypoints densely positioned solely on the vascular tree and in the image borders, GLAMpoints (NMS10) extracts interest points over the entire retina, including challenging areas such as the fovea and avascular zones, leading to a substantial rise in the number of correct matches.

Figure 5:
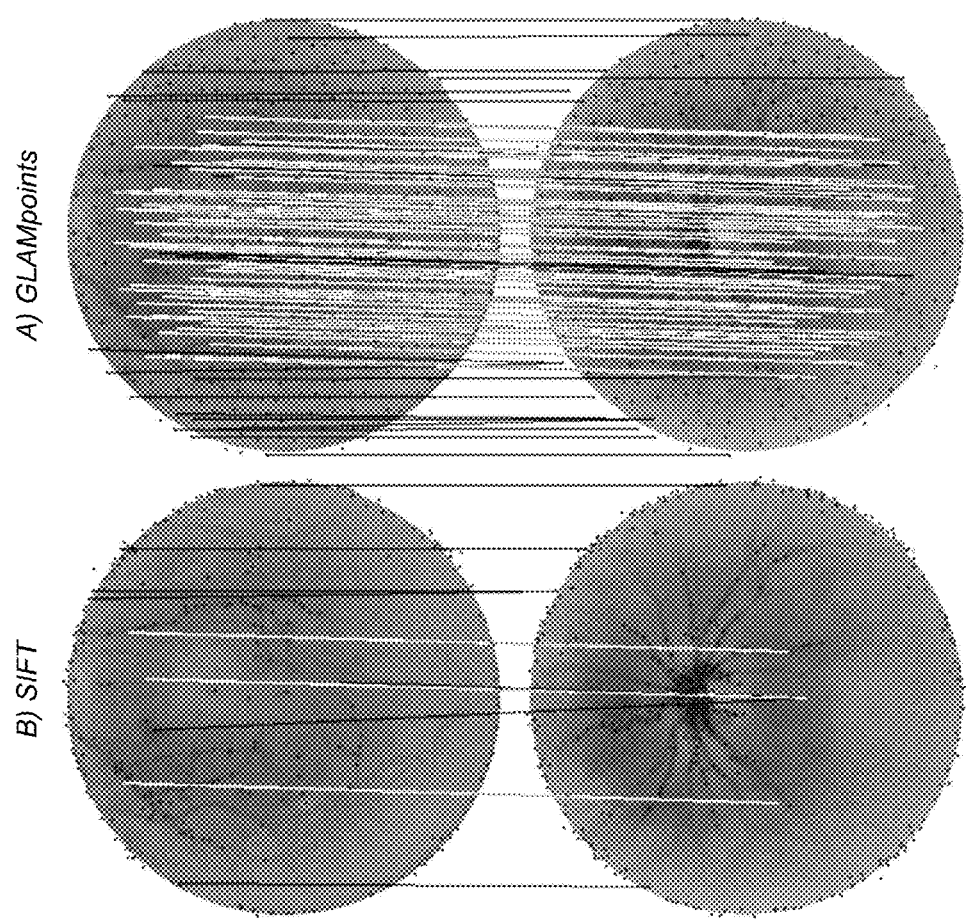
FIG. 5 illustrates how points may be matched in another practical example.

FIG. 5 shows detected interest points and corresponding matches for a pair of images from the FIRE dataset, non pre-processed. The black dots denote detected interest points. White lines denote true positive matches, whereas black lines denote false positive matches. Row A) shows the interest points and matches achieved by using GLAMpoints, whereas row B) shows the interest points and matches achieved by using SIFT.

Even though GLAMpoints (NMS10) outperformed all other detectors, LIFT and SuperPoint also operate very well on the FIRE dataset. Indeed, this dataset presents well-defined corners on a clearly contrasted vascular tree. LIFT manages to extract keypoints spread over the entire image and SuperPoint was trained to detect corners on synthetic primitive shapes. However, as evidenced on the slit lamp dataset, the performance of SuperPoint strongly deteriorates on images with less clear features.

FIG. 5 shows matches between an image pair of the FIRE dataset, for the presented method of GLAMpoints (NMS10) and SIFT. More examples of matches for all detectors can be found elsewhere in this description.

In certain embodiments, the feature detector disclosed herein may be used in a system or method that can create mosaics from fundus slit lamp videos. To do so, keypoints and descriptors are extracted on each frame, homographies are estimated between consecutive images using RanSaC. Images are then warped according to the computed homographies. Using 10 videos containing 25 to 558 images, mosaics were generated by registering consecutive frames. The average number of frames before the registration failed (due to a lack of extracted keypoints or matches between a pair of images) were calculated. Over those ten videos, the average number of registered frames before failure is 9.98 for GLAMpoints (NMS15) and 1.04 for SIFT. Examples of such mosaics are presented in FIG. 6.

Figure 6:
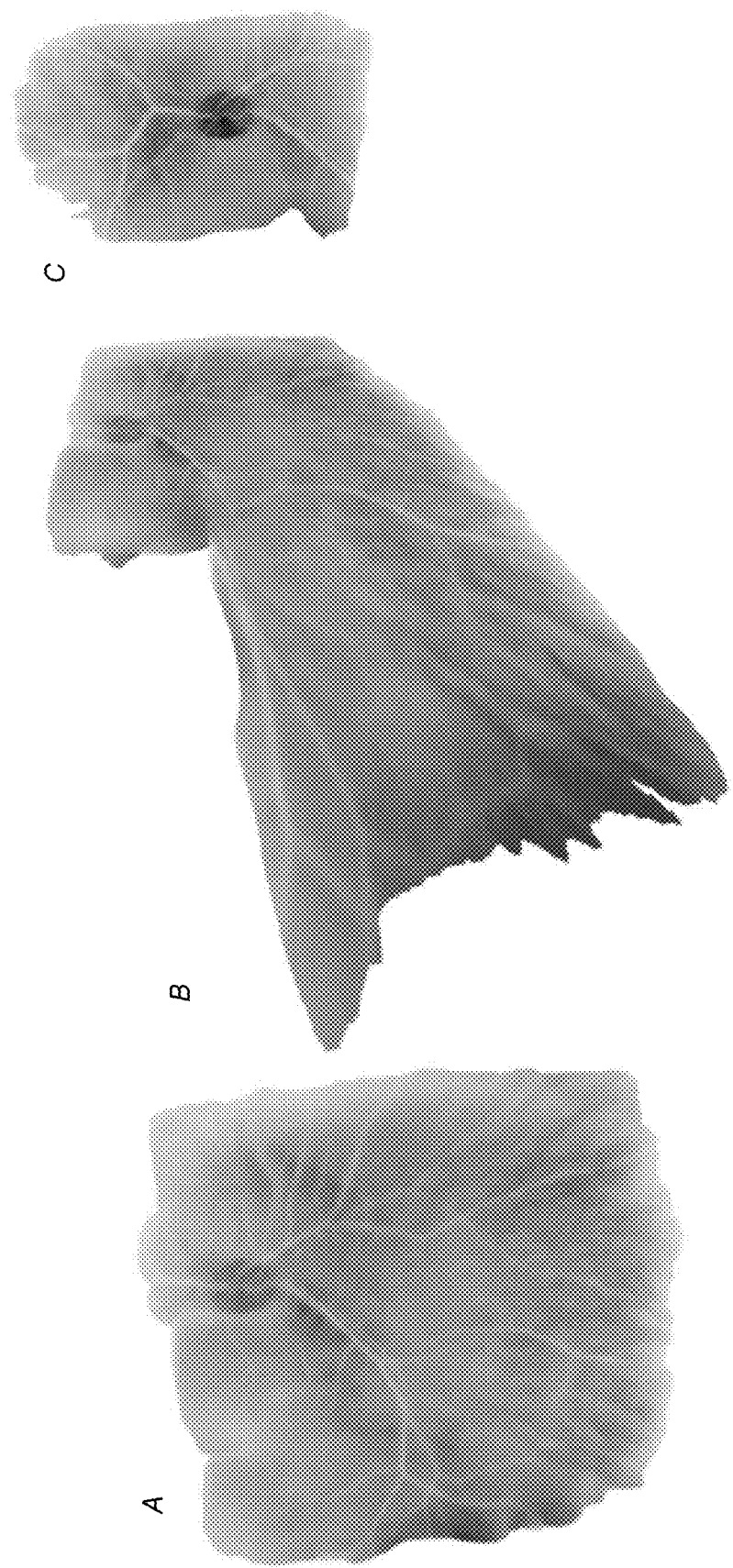
FIG. 6 shows mosaics made from registration of consecutive images.

FIG. 6 shows mosaics made from registration of consecutive images until failure. A) GLAMpoints, non pre-processed data, 53 frames, B) SIFT, pre-processed data, 34 frames, C) SIFT, non pre-processed images, 11 frames.

From the same video, SIFT failed after 34 frames when the data was pre-processed and only after 11 frames on original data while GLAMpoints successfully registered 53 consecutive images, without visual errors. It may be noted that the mosaics were created with frame to frame matching and no bundle adjustment. The same blending method was used as described in [46].

The run time of detection was computed over 84 pairs of images with a resolution of 660 px by 350 px. The GLAMpoints architecture was run on a GeForce GTX GPU while NMS and SIFT used a CPU. Mean and standard deviation of run time for GLAMpoints (NMS10) and SIFT are presented in Table 3.

TABLE 3

Average run time [ms] for detection of an image for our detector and SIFT detector.

|  | GLAMpoints (NMS10) | SIFT |
| --- | --- | --- |
| Pre-processing | 0.0 | 16.64 ± 0.93 |
| Detection image I | CNN: 16.23 ± 96.86 | 28.94 ± 1.88 |
|  | NMS: 11.2 ± 1.05 |  |
| Total | 27.48 ± 98.74 | 45.58 ± 4.69 |

The results on natural images were computed with GLAMpoints trained on slit lamp images. Globally on the natural images, GLAMpoints reached a success rate of 75.38% for acceptable registrations, against 85.13% for the best performing detector—SIFT with rotation invariance—and 83.59% for SuperPoint. It also rised to state of the art results in AUC, M:score and coverage fraction, for which it scored respectively second, second and first best. In repeatability, GLAMpoints obtained the second last position after SIFT, KAZE and LF-NET even though it successfully registered more images than the latter's, showing once again that repeatability is not the most adequate metric to measure the performance of a detector. The details of the metrics are given elsewhere in this description. Finally, it may be noted that the outdoor images of this dataset are completely different from the medical fundus images on which GLAMpoints was trained, which indicates substantial generalization properties.

The presented method uses deep RL to train a learnable detector, called GLAMpoints in this description. The detector may outperform the state of the art in image matching and registration of medical fundus images, for example. Experiments demonstrate that (1) The detector was trained directly for matching ability associated with a particular descriptor, with only a part of the pipeline being differentiable. Most other detectors are designed for repeatability which can be misleading because key points may be repeatable but not suitable for matching purposes. (2) The training can be done using only synthetic data. This removes the need for time consuming manual annotations and offers flexibility in the amount of training data used. (3) The training method is flexible in terms of domain, and while it was optimized to be successful on medical fundus images, it can be applied to other types of images. (4) The trained CNN detects significantly more good key points leading to correct matches in low textured images that do not present many corners/features compared to other state of the art detectors. As a result, no explicit pre-processing of the images was found to be necessary. (5) Any already existing feature descriptor can potentially be improved by training a good corresponding detector.

In alternative embodiments, it is possible to compute a rotationally invariant descriptor along with the keypoint location. Both detection and description may be trained end-to-end using a similar method. Moreover, although the present experiments were performed with the U-Net CNN architecture, other CNN architectures may be applied as well that might, in some cases, give better performance than U-Net (UNet).

In the following, supplementary details on the training method are disclosed. It will be understood that these details are to be regarded as non-limiting examples.

Performance comparison between SIFT descriptor with/without rotation invariance was made. Greedily Learned Accurate Match Points (GLAMpoints) detector was trained and tested in association with Scale-Invariant Feature Transform (SIFT) descriptor rotation-dependent, because SIFT descriptor without rotation invariance performs better than the rotation invariant version on fundus images. The details of the metrics evaluated on the pre-processed slit lamp dataset for both versions of SIFT descriptor are exposed in Table 4.

TABLE 4

Metrics calculated over 206 pre-processed pairs of the slitlamp dataset. Best results of each category are indicated in bold.

|  | SIFT with rotation invariance | SIFT rotation-dependent |
| --- | --- | --- |
| Success rate of Acceptable Registrations [%] | 49.03 | 50.49 |
| Success rate of Inaccurate Registrations [%] | 50.49 | 47.57 |
| Success rate of Failed Registrations [%] | 0.49 | 1.94 |
| M.score | 0.0470 ± 0.003 | 0.056 ± 0.003 |
| Coverage Fraction | 0.1348 ± 0.010 | 0.15 ± 0.012 |
| AUC | 0.1274 ± 0.008 | 0.143 ± 0.007 |

An exemplary method for homography generation is outlined in the following. This homography generation may be performed to generate training data comprising pairs of images from data comprising single images. Let B be the set of base images of size H×W, used for training. At every step i, an image pair $I_i$, $I'_i$ is generated from an original image $B_i$ by applying two separate, randomly sampled homography transforms $g_i$, $g'_i$. Each of those homography transforms is a composition of rotation, shearing, perspective, scaling and translation elements. Other combinations of transformation types can be used alternatively. Exemplary minimum and maximum values of the parameters are given in table 5.

TABLE 5

Exemplary parameters for random homography generation during training.

| Scaling | Perspective | Translation | Shearing | Rotation |
| --- | --- | --- | --- | --- |
| min scaling | 0.7 min perspective parameter | 0.000001 max horizontal displacement | 100 min/max horizontal shearing | −0.2/0.2 max angle 25 |
| max scaling | 1.3 max perspective parameter | 0.0098 max vertical displacement | 100 min/max vertical shearing | −0.2/0.2 |

Figure 7:
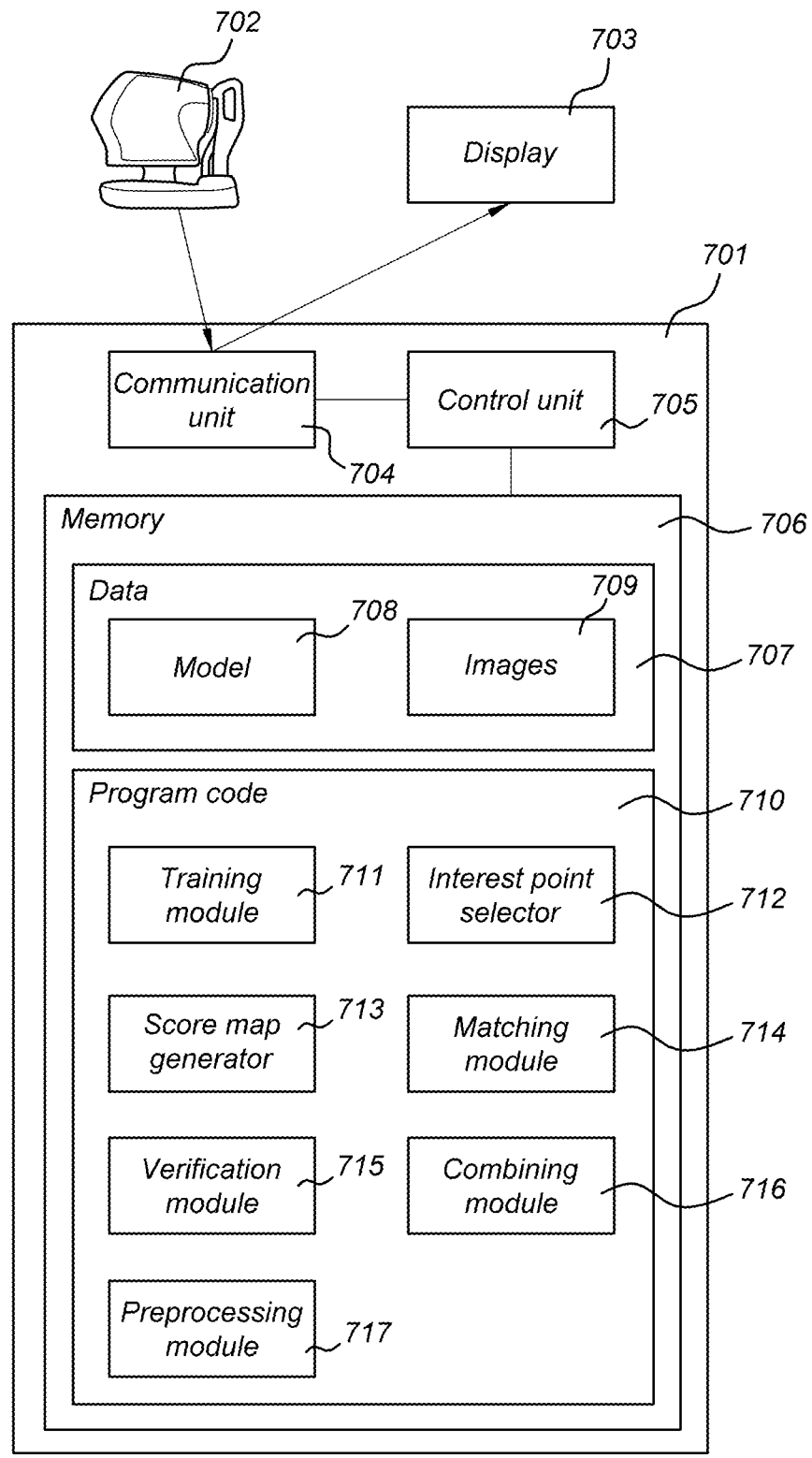
FIG. 7 shows a block diagram of a system for training a model for feature point detection.

FIG. 7 illustrates a system 701 for training a model for feature point detection. The system 701 may comprise a control unit 705, a communication unit 704, and a memory 706. The control unit 705 may comprise any processor or plurality of cooperating processors. The control unit 705 may alternatively be implemented by means of dedicated electronic circuitry. The communication unit 704 may comprise any kind of interface to connect a peripheral device, such as a camera 702 or display 703, and may comprise a network connection, for example, for exchange of data and/or control of external devices. In alternative embodiments, the camera 702 and/or the display may be incorporated in the system 701, as single apparatus. In alternative embodiments, the images captured by the camera 702 may be stored in an external database (not illustrated), and subsequently transmitted to the communication unit 704. Similarly, data generated by the system 701 may be stored in the external database before being displayed on a display. To that end, the communication unit 704 may be connected, for example via a network, to a data server.

The control unit 705 controls the operation of the system 701. For example, the control unit 705 executes code stored in the memory 706. The memory 706 may comprise any storage means, such as RAM, ROM, flash, magnetic disc, or any other volatile, or non-volatile computer readable media, or a combination thereof. For example, computer instructions may be stored in non-volatile computer readable media. The memory 706 may further comprise data 707, such as images 709, a model 708, and any other data. The program code may be divided in to functional units or modules. However, this is not a limitation.

In operation, the control unit 705 may be configured to retrieve a plurality of images from the camera 702 or retrieve images captured by the camera 702 from an external storage media, and store the images 709 in the memory 706.

The system may comprise a training module 711 to train a model 708. The model may comprise a neural network, e.g. a convolutional neural network, or another model, such as a statistical model, of which the model parameters may be tuned by a training process carried out by a training module 711.

The training module 711 may be configured to perform the training procedure including feeding input values to the model 708, evaluating the output values output by the model 708 in response to the input values, and adjusting model parameters of the model 708 based on the outcome of the evaluation.

The communication unit 704 may be configured, under control of the control unit 705, to receive a plurality of images. These images 709 may be stored in memory 707.

Optionally, the control unit 705 controls a camera 702 (internal or external camera) to generate the images and transmit them to the communication unit 704 and store them in the memory 707.

The system 701 may comprise a preprocessing module 717 that generates a pair of images of a single image. For example, the preprocessing module 717 is configured to generate a random transformation and generate a second image by applying the transformation to a first image. Alternatively, the preprocessing module 717 may be configured to generate two random transformations and generate a first image from a specific image by applying the first random transformation and generate a second image from the same specific image by applying the second random transformation to the specific image. The type of random transformations to be generated may be carefully configured to correspond to typical movements occurring in a particular application domain. In alternative embodiments, two images generated by the camera are manually registered, so that the transformation between the two images becomes available.

The processor may obtain such a pair of images including a first image and a second image from the memory 709.

The system 701 may comprise a score map generator 713 configured to generate a first score map for the first image and a second score map for the second image using the model. That is, the score map generator 713 may be configured to perform optional preprocessing operation (normalization and the like, or other kind of preprocessing). However, it is observed that good results were achieved also without preprocessing. The resulting image may be provided as an input to the model 708. The corresponding output generated by the model 708 in response to the input, may comprise another image (the score map), of which each pixel is related to the likelihood that the point is a suitable interest point for the purpose of registration of the image to another image. It is observed that the score map generator 713 may be configured to perform the processing for the first image and the second image separately, one independently of the other, that is, without using any knowledge about the content of the other image.

The system 701 may further comprise an interest point selector 702. The interest point selector 712 may be configured to select a first plurality of interest points in the first image based on the first score map, and to select a second plurality of interest points in the second image based on the second score map. Again, the processing of both images may be separate independent processes. For example, the points having the largest score on the score map may be selected as interest points. In certain embodiments, a maximum and/or a minimum distance between neighboring interest points may be imposed by algorithmic means. For example, in each N×M block of pixels only the highest score pixel is chosen. Other algorithms for influencing the maximum and/or minimal distance between adjacent points may be envisaged.

The system may comprise a matching module 716. The matching module 716 may be configured to process the images in pairs. Specifically, the matching module 716 performs pairwise matching of a first interest point among the first plurality of interest points with a second interest point among the second plurality of interest points. In other words, an interest point in the first image is matched with an interest point in the second image. For example, a feature descriptor is calculated at the interest points in both images, and a similarity measure is calculated between the feature description of an interest point in the first image and the feature description of an interest point in the second image. Pairs having the highest similarity measure may be chosen as a matching pair. Other, methods of matching may be envisaged.

The system may comprise a verification module 715 configured to check correctness of the pairwise matches generated by the matching module 714. To this end, the verification module 715 may have access to ground truth information. For example, when a pair of images has been generated artificially using differing (affine) transformation of the same image, this transformation contains the ground truth matching of the points of the pair of images. Therefore, applying the transformation on a point in the first image should result in the corresponding matching point in the second image. The distance (e.g. Euclidean distance) between the matching point in the second image and the ground truth transformation of the point in the first image can be regarded as an error of the matching points. A reward may be based on such an error measure: the lower the error, the higher the reward and vice versa. This way, for each matching point, a reward can be calculated. This may result in a reward map, or reward matrix. The reward of an interest point in the first image is thus correlated to the success of the matching with the matched point in the second image, as found by the matching module 714.

The system may comprise a combining module 716 for combining or comparing the score map and the reward map. That is, if the score for a point generated by the score map generator 713 was high and the and the reward for that point generated by the verification module 715 was also high ('true positive'), the combining module 716 may determine a value to reinforce the model 708 to identify similar interest points in the future. On the other hand, if the score for a point generated by the score map generator 713 was high, but the reward for that point generated by the verification module 715 was low ('false positive'), the combining module 716 may determine a value to reinforce the model 708 to refrain from identifying similar interest points in the future. In certain embodiments, the combining module 716 is configured to determine a reward only for a subset of the false positives. For example, if the number of true positives in an image was M, then at most M false positives are taken into account. All the values may be summed to compute a total reward function, for example.

The training module 711 may be configured to update the model based on the result of the combining or comparing. This is a training step of a model, that is known in the art per se. The precise parameters to update depend on the type of model in use, such as nearest neighbor, neural network, convolutional neural network, U-net or other type of model.

The interest point selector 712 may be configured to impose a maximum limit on a distance from any point in the image to a nearest one of the interest points.

The matching module 714 may be configured to perform the pairwise matching based on a similarity between a feature detected in the first image at the first interest point and a feature detected in the second image at the second interest point.

The matching module 714 may be configured to perform the matching in a first direction by matching a first interest point to a second interest point among second interest points, the second interest point having a feature most similar to the feature at the first interest point. The matching module 714 may be configured to perform further matching is performed in a second direction by matching a second interest point to a first interest point among first interest points, the first interest point having a feature most similar to the feature at the second interest point. The matching module 714 may be configured to discard any and all matches that do not match in both directions.

The verification module 715 may be configured to indicate, by means of the reward map, a reward for a successfully matched interest point according to ground truth data and no reward for an unsuccessfully matched interest point according to ground truth data.

The combining module 716 may be configured to combine or compare only the score map and reward map for the interest points.

The combining module 716 may be configured to balance a number of true positive matches with a number of false positive matches by making a (possibly random) selection of the false positive matches and combining or comparing the score map and reward map only for the true positive matches and the selection of the false positive matches, wherein a true positive match is an interest point that passed the check of correctness and a false positive match is an interest point that did not pass the check of correctness. Instead of making a random selection, the combining module 716 may be configured, for example, to select false positive matches having the lowest reward map value.

The combining module 716 may be configured to compute a sum of squared differences between the score map and reward map.

The communication unit 704 may be configured to output interesting information such as progress information or the value of the latest output of the combining module by means of the display 703.

Figure 8:
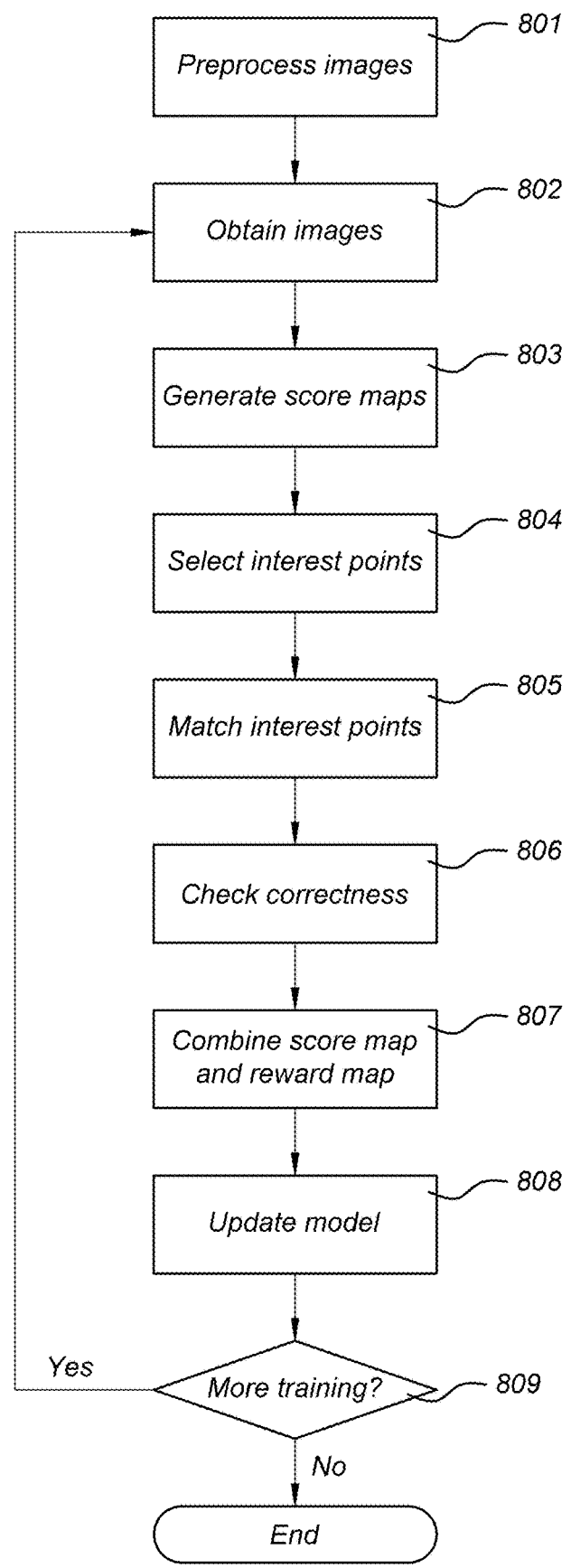
FIG. 8 shows a flowchart of a method of training a model for feature point detection.

FIG. 8 illustrates a method of training a model for feature point detection. In step 801, a preprocessing step may include generating pairs of images from original images using e.g. a random transformation, and storing the random transformation as ground truth information of the pair of images thus created.

Step 802 may comprise obtaining a first image and a second image of a pair of images. Step 803 may comprise generating a first score map for the first image and a second score map for the second image using the model. Step 804 may comprise selecting a first plurality of interest points in the first image based on the first score map, and selecting a second plurality of interest points in the second image based on the second score map.

Step 805 may comprise pairwise matching of a first interest point among the first plurality of interest points with a second interest point among the second plurality of interest points. Step 806 may comprise checking correctness of the pairwise matches based on a ground truth transformation between the first image and the second image, to generate a reward map. Step 807 may comprise combining or comparing the score map and the reward map. Step 808 may comprise updating the model based on the result of the combining or comparing. In step 809, the process may check whether more training is desired. If more training is desired, the process may proceed from step 802, by obtaining the next pair of images.

Figure 9:
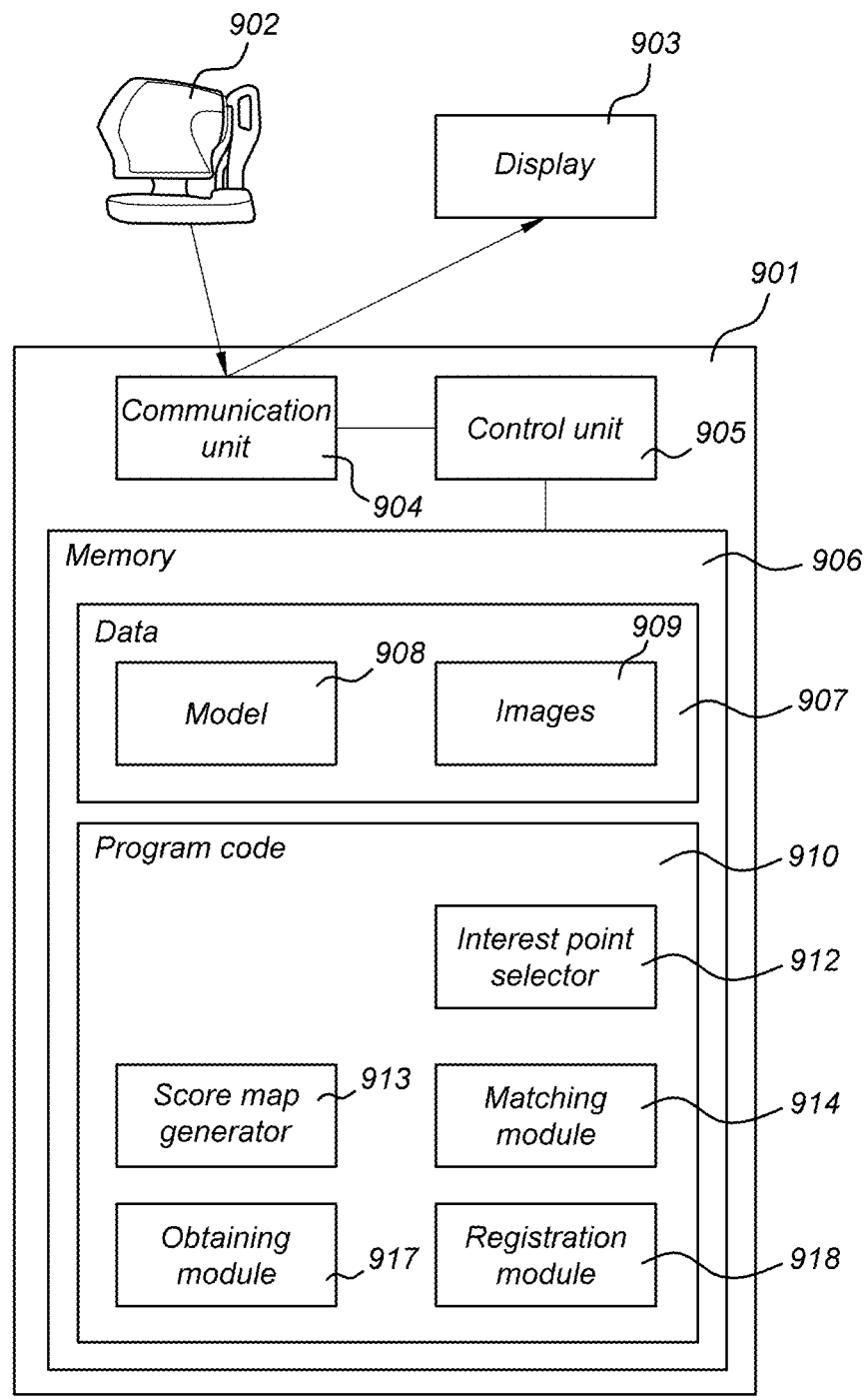
FIG. 9 shows a block diagram of a system for registering a first image to a second image.

FIG. 9 illustrates a system 901 for registering a first image to a second image. The apparatus comprises a control unit 905, a communication unit 904, and a memory 906, to store data 907 and program code 910. Considerations relating to the hardware and alternative implementation options described hereinabove in respect of a system 701 for training a model for feature point detection also apply to the system 901 for registering a first image to a second image. For example, the program code 910 may alternatively be implemented by dedicated electronic circuitry. Moreover, the camera 902 and display 903 may be optional external devices, or may be integrated into the system 901 to form an integrated apparatus. The system 901 comprises a control unit 905, e.g. at least one computer processor, a communication unit 904 for communicating with, for example, a camera 902 and/or a display 903, and a memory 906 (any kind of storage media) comprising program code 910 or instructions for causing the control unit to perform certain steps. The memory 906 is configured for being able to store a trained model 908 and images 909. For example, images received from the camera 902 may be stored in the memory 909.

The system may comprise an obtaining module 917 configured to obtain a first image and a second image, for example two images captured by and received from the camera 902, for example from among the stored images 909. The system may further comprise a score map generator 913 configured to generate a first score map for the first image and a second score map for the second image, using the trained model 908. For example, both images, after optional preprocessing, such as normalization, may be input to the model 908, and the output generated in response to each image is a score map.

The system may comprise an interest point selector configured to select a first plurality of interest points in the first image based on the first score map, and select a second plurality of interest points in the second image based on the second score map. This selection may be done similar to the selection performed by the interest point selector 712, using a feature descriptor and the similarity between the feature descriptions of interest points in both images. The system may comprise a matching module 914 configured to pairwise match a first interest point among the first plurality of interest points with a second interest point among the second plurality of interest points.

The system may further comprise a registration module 918. The registration module 918 may be configured to determine a morphological transformation based on the matched interest points. The registration module 918 may be configured to map each point in the first image to a corresponding point in the second image, based on the matched interest points. For example, an affine or non-affine transformation may be determined based on the matching points. This may involve another parameter fitting procedure. However, manners to generate such a transformation from a set of matching points are known in the art per se and are not elaborated herein in greater detail. For example, the transformation may be applied to the first image or to the second image. The communication unit 904 may be configured to output a transformed image by means of the display 903.

The interest point selector 912 may be configured to impose a maximum limit on a distance from any point in the image to a nearest one of the interest points.

The matching module 914 may be configured to perform the pairwise matching based on a similarity between a feature detected in the first image at the first interest point and a feature detected in the second image at the second interest point.

The matching module 914 may be configured to perform the matching in a first direction by matching a first interest point to a second interest point among second interest points, the second interest point having a feature most similar to the feature at the first interest point. The matching module 914 may be further configured to perform the matching in a second direction by matching a second interest point to a first interest point among first interest points, the first interest point having a feature most similar to the feature at the second interest point. For example, the matching module 914 may be configured to discard matches that do not match in both directions.

FIG. 10 illustrates an exemplary method of registering a first image to a second image. Step 1002 may comprise obtaining a first image and a second image, for example two captured images from a camera. Step 1003 may comprise generating a first score map for the first image and a second score map for the second image using a properly trained model, for example a model trained by a system or method disclosed herein. Step 1004 may comprise selecting a first plurality of interest points in the first image based on the first score map, and selecting a second plurality of interest points in the second image based on the second score map. Step 1005 may comprise pairwise matching of a first interest point among the first plurality of interest points with a second interest point among the second plurality of interest points, for example based on a feature descriptor relating to the interest points. Optionally, step 1006 may comprise registering the pair of images by generating a morphological transformation according to the matched interest points. Optionally, step 1006 comprises applying the transformation to the image and outputting the transformed image using a display or storing the transformed image. Alternatively, step 1006 comprises stitching the pair of images together to using the matched interest points and storing or displaying the stitched image.

Some or all aspects of the invention may be suitable for being implemented in form of software, in particular a computer program product. The computer program product may comprise a computer program stored on a non-transitory computer-readable media. Also, the computer program may be represented by a signal, such as an optic signal or an electro-magnetic signal, carried by a transmission medium such as an optic fiber cable or the air. The computer program may partly or entirely have the form of source code, object code, or pseudo code, suitable for being executed by a computer system. For example, the code may be executable by one or more processors.

The examples and embodiments described herein serve to illustrate rather than limit the invention. The person skilled in the art will be able to design alternative embodiments without departing from the spirit and scope of the present disclosure, as defined by the appended claims and their equivalents. Reference signs placed in parentheses in the claims shall not be interpreted to limit the scope of the claims. Items described as separate entities in the claims or the description may be implemented as a single hardware or software item combining the features of the items described.

The following subject-matter is disclosed in form of clauses.

1. A method to train a classifier for feature point detection, comprising
   obtaining a first image and a second image;
   generating a first score map for the first image and a second score map for the second image using the classifier;
   selecting a first plurality of interest points in the first image based on the first score map;
   selecting a second plurality of interest points in the second image based on the second score map;
   pairwise matching of a first interest point among the first plurality of interest points with a second interest point among the second plurality of interest points;
   checking correctness of the pairwise matches based on a ground truth transformation between the first image and the second image, to generate a reward map;
   combining or comparing the score map and the reward map;
   updating the classifier based on the result of the combining or comparing.

2. The method of clause 1, wherein selecting a plurality of interest points comprises imposing a maximum limit on a distance from any point in the image to a nearest one of the interest points.

3. The method of any preceding clause, wherein the pairwise matching is performed based on a similarity between a feature detected in the first image at the first interest point and a feature detected in the second image at the second interest point.

4. The method of any preceding clause, wherein the matching is performed in a first direction by matching a first interest point to a second interest point among second interest points, the second interest point having a feature most similar to the feature at the first interest point.

5. The method of clause 4, wherein the matching is further performed in a second direction by matching a second interest point to a first interest point among first interest points, the first interest point having a feature most similar to the feature at the second interest point.

6. The method of any preceding clause, wherein the reward map indicates a reward for a successfully matched interesting point and no reward for an unsuccessfully matched interesting point.

7. The method of any preceding clause, wherein the combining or comparing comprises combining or comparing only the score map and reward map for the interesting points.

8. The method of any preceding clause, wherein the combining or comparing comprises balancing a number of true positive matches with a number of false positive matches by making a (possibly random) selection of the false positive matches and combining or comparing the score map and reward map only for the true positive matches and the selection of the false positive matches, wherein a true positive match is an interesting point that passed the check of correctness and a false positive match is an interesting point that did not pass the check of correctness.

8. The method of any preceding clause, wherein the combining or comparing comprises computing a sum of squared differences between the score map and reward map.

9. An apparatus for training a classifier for feature point detection, comprising
a control unit, e.g. at least one computer processor, and
a memory comprising instructions for causing the control unit to perform the steps of:
obtaining a first image and a second image;
generating a first score map for the first image and a second score map for the second image using the classifier;
selecting a first plurality of interest points in the first image based on the first score map;
selecting a second plurality of interest points in the second image based on the second score map;
pairwise matching of a first interest point among the first plurality of interest points with a second interest point among the second plurality of interest points;
checking correctness of the pairwise matches based on a ground truth transformation between the first image and the second image, to generate a reward map;
combining or comparing the score map and the reward map;
updating the classifier based on the result of the combining or comparing.

10. A method of registering a first image to a second image, the method comprising
obtaining a first image and a second image;
generating a first score map for the first image and a second score map for the second image using a classifier generated by the method or apparatus of any preceding clause;
selecting a first plurality of interest points in the first image based on the first score map;
selecting a second plurality of interest points in the second image based on the second score map;
pairwise matching of a first interest point among the first plurality of interest points with a second interest point among the second plurality of interest points.

11. The method of clause 10, wherein selecting a plurality of interest points comprises imposing a maximum limit on a distance from any point in the image to a nearest one of the interest points.

12. The method of clause 10 or 11, wherein the pairwise matching is performed based on a similarity between a feature detected in the first image at the first interest point and a feature detected in the second image at the second interest point.

13. The method of any of clauses 10 to 12, wherein the matching is performed in a first direction by matching a first interest point to a second interest point among second interest points, the second interest point having a feature most similar to the feature at the first interest point.

14. The method of clause 13, wherein the matching is further performed in a second direction by matching a second interest point to a first interest point among first interest points, the first interest point having a feature most similar to the feature at the second interest point.

15. An apparatus for registering a first image to a second image, comprising
a control unit, e.g. at least one computer processor, and
a memory comprising instructions for causing the control unit to perform the steps of:
obtaining a first image and a second image;
generating a first score map for the first image and a second score map for the second image using a classifier generated by the method or apparatus of any preceding clause;
selecting a first plurality of interest points in the first image based on the first score map;
selecting a second plurality of interest points in the second image based on the second score map;
pairwise matching of a first interest point among the first plurality of interest points with a second interest point among the second plurality of interest points.

REFERENCES

[1] OpenCV:cv::BFMatcher Class Reference.

[2] OpenCV:cv::xfeatures2d::SIFT Class Reference.

[3] Improving Accuracy and Efficiency of Mutual Information for Multi-modal Retinal Image Registration using Adaptive Probability Density Estimation. Computerized Medical Imaging and Graphics, 37(7-8):597-606, 2013.

[4] M. Abadi, A. Agarwal, P. Barham, E. Brevdo, Z. Chen, C. Citro, G. S. Corrado, A. Davis, J. Dean, M. Devin, S. Ghemawat, I. Goodfellow, A. Harp, G. Irving, M. Isard, Y. Jia, R. Jozefowicz, L. Kaiser, M. Kudlur, J. Levenberg, D. Man'e, R. Monga, S. Moore, D. Murray, C. Olah, M. Schuster, J. Shlens, B. Steiner, I. Sutskever, K. Talwar, P. Tucker, V. Vanhoucke, V. Vasudevan, F. Vi'egas, O. Vinyals, P. Warden, M. Wattenberg, M. Wicke, Y. Yu, and X. Zheng. Tensor-Flow: Large-scale machine learning on heterogeneous systems, 2015. Software available from tensorflow.org.

[5] A. Alahi, R. Ortiz, and P. Vandergheynst. FREAK: Fast Retina Keypoint. Proceedings of the Conference on Computer Vision and Pattern Recognition, pages 510-517, 2012.

[6] P. F. Alcantarilla, A. Bartoli, and A. J. Davison. KAZE features. Lecture Notes in Computer Science, 7577 LNCS (6):214-227, 2012.

[7] J. Aldana-Iuit, D. Mishkin, O. Chum, and J. Matas. In the saddle: Chasing fast and repeatable features. In 23rd International Conference on Pattern Recognition, pages 675-680, 2016.

[8] R. Arandjelovi and A. Zisserman. Three things everyone should know to improve object retrieval c.

[9] V. Balntas, E. Johns, L. Tang, and K. Mikolajczyk. PN-Net: Conjoined Triple Deep Network for Learning Local Image Descriptors. CoRR, abs/1601.05030, 2016.

[10] V. Balntas, K. Lenc, A. Vedaldi, and K. Mikolajczyk. HPatches: A Benchmark and Evaluation of Handcrafted and Learned Local Descriptors. In Conference on Computer Vision and Pattern Recognition, pages 3852-3861, 2017.

[11] H. Bay, T. Tuytelaars, and L. Van Gool. SURF: Speeded up Robust Features. Lecture Notes in Computer Science, 3951 LNCS:404-417, 2006.

[12] P. C. Cattin, H. Bay, L. J. V. Gool, and G. Sz'ekely. Retina Mosaicing Using Local Features. In Medical Image Computing and Computer-Assisted Intervention, pages 185-192, 2006.

[13] J. Chen, J. Tian, N. Lee, J. Zheng, T. R. Smith, and A. F. Laine. A Partial Intensity Invariant Feature Descriptor for Multimodal Retinal Image Registration. IEEE Transactions on Biomedical Engineering, 57(7):1707-1718, 2010.

[14] A. V. Cideciyan. Registration of Ocular Fundus Images. IEEE Engineering in Medicine and Biology Magazine, 14(1):52-58, 1995.

[15] A. L. Dahl, H. Aanaes, and K. S. Pedersen. Finding the Best Feature Detector-Descriptor Combination. In International Conference on 3D Imaging, Modeling, Processing, Visualization and Transmission, pages 318-325, 2011.

[16] D. DeTone, T. Malisiewicz, and A. Rabinovich. SuperPoint: Self-Supervised Interest Point Detection and Description. In IEEE Conference on Computer Vision and Pattern Recognition Workshops, pages 224-236, 2018.

[17] H. Durrant-Whyte and T. Bailey. Simultaneous Localisation and Mapping (SLAM): Part I The Essential Algorithms. Technical report.

[18] P. Fischer and T. Brox. Descriptor Matching with Convolutional Neural Networks: a Comparison to SIFT. pages 1-10.

[19] M. A. Fischler and R. C. Bolles. Random sample consensus: a paradigm for model fitting with applications to image analysis and automated cartography. Communications of the ACM, 24(6):381-395, June 1981.

[20] Y. Hang, X. Zhang, Y. Shao, H. Wu, and W. Sun. Retinal Image Registration Based on the Feature of Bifurcation Point. In 10th International Congress on Image and Signal Processing, BioMedical Engineering and Informatics, CISPBMEI, pages 1-6, 2017.

[21] C. G. Harris and M. Stephens. A Combined Corner and Edge Detector. In Proceedings of the Alvey Vision Conference, pages 1-6, 1988.

[22] C. Hernandez-Matas, X. Zabulis, A. Triantafyllou, and P. Anyfanti. FIRE: Fundus Image Registration dataset. Journal for Modeling in Ophthalmology, 4:16-28, 2017.

[23] J. Z. Huang, T. N. Tan, L. Ma, and Y. H. Wang. Phase Correlation-based Iris Image Registration Kodel. Journal of Computer Science and Technology, 20(3):419-425, 2005.

[24] N. Jacobs, N. Roman, and R. Pless. Consistent Temporal Variations in Many Outdoor Scenes. Proceedings of the IEEE Conference on Computer Vision and Pattern Recognition, 2007.

[25] D. P. Kingma and J. Ba. Adam: A Method for Stochastic Optimization. CoRR, abs/1412.6980, 2014.

[26] S. Leutenegger, M. Chli, and R. Y. Siegwart. BRISK: Binary Robust Invariant Scalable Keypoints. Proceedings of the IEEE International Conference on Computer Vision, pages 2548-2555, 2011.

[27] P. Li, Q. Chen, W. Fan, and S. Yuan. Registration of OCT Fundus Images with Color Fundus Images Based on Invariant Features. In Cloud Computing and Security—Third International Conference, pages 471-482, 2017.

[28] D. G. Lowe. Distinctive Image Features from Scale Invariant keypoints. International Journal of Computer Vision, 60, 2004.

[29] K. Mikolajczyk and C. Schmid. A Performance Evaluation of Local Descriptors. IEEE Transactions on Pattern Analysis and Machine Intelligence, 27(10):1615-1630, 2005.

[30] K. Mikolajczyk, T. Tuytelaars, C. Schmid, A. Zisserman, J. Matas, F. Schaffalitzky, T. Kadir, and L. Van Gool. A Comparison of Affine Region Detectors. International Journal of Computer Vision.

[31] Y. Ono, E. Trulls, P. Fua, and K. M. Yi. LF-Net: Learning Local Features from Images. In Advances in Neural Information Processing Systems, pages 6237-6247, 2018.

[32] J. P. W. Pluim, J. B. A. Maintz, and M. A. Viergever. Mutual Information Based Registration of Medical Images: A Survey. IEEE Transactions on Medical Imaging, 22(8):986-1004, 2003.

[33] R. Ramli, M. Yamani, I. Idris, K. Hasikin, N. K. A. Karim, A. Wahid, A. Wahab, I. Ahmedy, F. Ahmedy, N. A. Kadri, and H. Arof. Feature-Based Retinal Image Registration Using D-Saddle Feature. 2017.

[34] O. Ronneberger, P. Fischer, and T. Brox. U-Net: Convolutional Networks for Biomedical Image Segmentation. In Medical Image Computing and Computer-Assisted Intervention, pages 234-241, 2015.

[35] E. Rublee, V. Rabaud, K. Konolige, and G. Bradski. ORB: An Efficient Alternative to SIFT or SURF. Proceedings of the IEEE International Conference on Computer Vision, pages 2564-2571, 2011.

[36] C. Sanchez-galeana, C. Bowd, E. Z. Blumenthal, P. A. Gokhale, L. M. Zangwill, and R. N. Weinreb. Using Optical Imaging Summary Data to Detect Glaucoma. Opthamology, pages 1812-1818, 2001.

[37] E. Simo-Serra, E. Trulls, L. Ferraz, I. Kokkinos, P. Fua, and F. Moreno-Noguer. Discriminative Learning of Deep Convolutional Feature Point Descriptors. In IEEE International Conference on Computer Vision, pages 118-126, 2015. 4

[38] B. Triggs, P. F. Mclauchlan, R. I. Hartley, and A. W. Fitzgibbon. Bundle Adjustment-A Modern Synthesis. Technical report.

[39] P. Truong, S. De Zanet, and S. Apostolopoulos. Comparison of Feature Detectors for Retinal Image Alignment. In ARVO, 2019.

[40] Y. Verdie, K. M. Yi, P. Fua, and V. Lepetit. TILDE: A Temporally Invariant Learned DEtector. Proceedings of the IEEE Computer Society Conference on Computer Vision and Pattern Recognition, pages 5279-5288, 2015.

[41] G. Wang, Z. Wang, Y. Chen, and W. Zhao. Biomedical Signal Processing and Control Robust Point Matching Method for Multimodal Retinal Image Registration. Biomedical Signal Processing and Control, 19:68-76, 2015.

[42] S. A. J. Winder and M. A. Brown. Learning Local Image Descriptors. In IEEE Conference on Computer Vision and Pattern Recognition, 2007.

[43] S. A. J. Winder, G. Hua, and M. A. Brown. Picking the Best DAISY. In IEEE Conference on Computer Vision and Pattern Recognition, pages 178-185, 2009.

[44] K. M. Yi, E. Trulls, V. Lepetit, and P. Fua. LIFT: Learned Invariant Feature Transform. In European Conference on Computer Vision—ECCV, pages 467-483, 2016.

[45] K. M. Yi, Y. Verdie, P. Fua, and V. Lepetit. Learning to Assign Orientations to Feature Points. In IEEE Conference on Computer Vision and Pattern Recognition, pages 107-116, 2016.

[46] S. D. Zanet, T. Rudolph, R. Richa, C. Tappeiner, and R. Sznitman. Retinal slit lamp video mosaicking. International Journal of Computer Assisted Radiology and Surgery, 11(6):1035-1041, 2016.

[47] C. L. Zhou, M. S. Rzeszotarski, L. J. Singerman, and J. M. Chokreff. The Detection and Quantification of Retinopathy Using Digital Angiograms. IEEE Transactions on Medical Imaging, 13(4):619-626, 1994.

[48] C. L. Zitnick and K. Ramnath. Edge Foci Interest Points. In International Conference on Computer Vision, pages 359-366, 2011.

The invention claimed is:

1. A method to train a model for feature point detection, comprising
    obtaining a first image and a second image;
    generating a first score map for the first image and a second score map for the second image using the model;
    selecting a first plurality of interest points in the first image based on the first score map;
    selecting a second plurality of interest points in the second image based on the second score map;
    pairwise matching of a first interest point among the first plurality of interest points with a second interest point among the second plurality of interest points based on a similarity between a feature detected in the first image at the first interest point and a feature detected in the second image at the second interest point;
    checking correctness of the pairwise matches based on a ground truth transformation between the first image and the second image, to generate a reward map;
    combining or comparing the score map and the reward map; and
    updating the model based on the result of the combining or comparing.

2. The method of claim 1, wherein selecting a plurality of interest points comprises imposing a maximum limit on a distance from any point in the image to a nearest one of the interest points.

3. The method of claim 1, wherein the matching is performed in a first direction by matching a first interest point to a second interest point among second interest points, the second interest point having a feature most similar to the feature at the first interest point.

4. The method of claim 3, wherein the matching is further performed in a second direction by matching a second interest point to a first interest point among first interest points, the first interest point having a feature most similar to the feature at the second interest point.

5. The method of claim 1, wherein the reward map indicates a reward for a successfully matched interest point according to ground truth data and no reward for an unsuccessfully matched interest point according to ground truth data.

6. The method of claim 1, wherein the combining or comparing comprises combining or comparing the score map and reward map only for the interest points.

7. The method of claim 1, wherein the combining or comparing comprises balancing a number of true positive matches with a number of false positive matches by making a, possibly random, selection of the false positive matches and combining or comparing the score map and reward map only for the true positive matches and the selection of the false positive matches,
    wherein a true positive match is an interest point that passed the check of correctness and a false positive match is an interest point that did not pass the check of correctness.

8. The method of claim 1, wherein the combining or comparing comprises computing a sum of squared differences between the score map and reward map.

9. An apparatus for registering a first image to a second image, comprising
    a control unit and
    a memory comprising instructions for causing the control unit to perform the steps of:
    obtaining a first image and a second image;
    generating a first score map for the first image and a second score map for the second image using a model trained by the method of claim 1;
    selecting a first plurality of interest points in the first image based on the first score map;
    selecting a second plurality of interest points in the second image based on the second score map; and
    pairwise matching of a first interest point among the first plurality of interest points with a second interest point among the second plurality of interest points based on a similarity between a feature detected in the first image at the first interest point and a feature detected in the second image at the second interest point.

10. A model for feature point detection obtained by the method of claim 1.

11. An apparatus for training a model for feature point detection, comprising
    a control unit; and
    a memory comprising instructions for causing the control unit to perform the steps of:
    obtaining a first image and a second image;
    generating a first score map for the first image and a second score map for the second image using the model;
    selecting a first plurality of interest points in the first image based on the first score map;
    selecting a second plurality of interest points in the second image based on the second score map;
    pairwise matching of a first interest point among the first plurality of interest points with a second interest point among the second plurality of interest points based on a similarity between a feature detected in the first image at the first interest point and a feature detected in the second image at the second interest point;
    checking correctness of the pairwise matches based on a ground truth transformation between the first image and the second image, to generate a reward map;
    combining or comparing the score map and the reward map; and
    updating the model based on the result of the combining or comparing.

12. A method of registering a first image to a second image, the method comprising
    obtaining a first image and a second image;
    generating a first score map for the first image and a second score map for the second image using a model trained by the apparatus of claim 11;
    selecting a first plurality of interest points in the first image based on the first score map;
    selecting a second plurality of interest points in the second image based on the second score map; and
    pairwise matching of a first interest point among the first plurality of interest points with a second interest point among the second plurality of interest points based on a similarity between a feature detected in the first image at the first interest point and a feature detected in the second image at the second interest point.

13. The method of claim 12, wherein selecting a plurality of interest points comprises imposing a maximum limit on a distance from any point in the image to a nearest one of the interest points.

14. The method of claim 12, wherein the pairwise matching is performed based on a similarity between a feature detected in the first image at the first interest point and a feature detected in the second image at the second interest point.

15. The method of claim 12, wherein the matching is performed in a first direction by matching a first interest point to a second interest point among second interest points, the second interest point having a feature most similar to the feature at the first interest point.

16. The method of claim 15, wherein the matching is further performed in a second direction by matching a second interest point to a first interest point among first interest points, the first interest point having a feature most similar to the feature at the second interest point.

* * * * *